US007254660B2

(12) United States Patent
Yamamoto

(10) Patent No.: US 7,254,660 B2
(45) Date of Patent: Aug. 7, 2007

(54) DATA TRANSFER METHOD AND DATA TRANSFER DEVICE

(75) Inventor: Naohiro Yamamoto, Kawasaki (JP)

(73) Assignee: Canon Kabushiki Kaisha (JP)

( * ) Notice: Subject to any disclaimer, the term of this patent is extended or adjusted under 35 U.S.C. 154(b) by 32 days.

(21) Appl. No.: 11/147,120

(22) Filed: Jun. 7, 2005

(65) Prior Publication Data

US 2005/0273539 A1 Dec. 8, 2005

(30) Foreign Application Priority Data

Jun. 7, 2004 (JP) ............................. 2004-169150

(51) Int. Cl.
*G06F 1/00* (2006.01)
(52) U.S. Cl. ..................................................... 710/110
(58) Field of Classification Search ................. 370/241
See application file for complete search history.

(56) References Cited

U.S. PATENT DOCUMENTS

| 4,748,643 | A | * | 5/1988 | Setoguchi et al. .......... 375/369 |
|---|---|---|---|---|
| 5,119,373 | A | * | 6/1992 | Fredricsson et al. ........ 370/458 |
| 5,432,920 | A | * | 7/1995 | Yazawa et al. ............. 710/112 |
| 5,487,067 | A | * | 1/1996 | Matsushige .................. 370/460 |
| 5,978,874 | A | * | 11/1999 | Singhal et al. .............. 710/107 |
| 6,005,869 | A | * | 12/1999 | Sakai et al. .................. 370/452 |
| 6,504,823 | B1 | * | 1/2003 | Nakajima et al. ........... 370/241 |
| 6,895,061 | B1 | * | 5/2005 | Stong ......................... 375/354 |

FOREIGN PATENT DOCUMENTS

JP 2001-142735 A 5/2001

* cited by examiner

Primary Examiner—James K. Trujillo
Assistant Examiner—Mohammed Rehman
(74) Attorney, Agent, or Firm—Rossi, Kimms & McDowell LLP

(57) ABSTRACT

A data transfer method which is capable of transferring a predetermined amount of data in one transaction at only one time, and preventing the number of ports of a master chip and the number of signal lines connected between the master chip and slave chips from being increased. A single master chip and a plurality of slave chips which receive data transferred from the master chip are connected by a ring-like path. Data is transferred from the master chip to the slave chips via the ring-like path.

15 Claims, 10 Drawing Sheets

DATA TRANSFER METHOD AND DATA TRANSFER DEVICE

BACKGROUND OF THE INVENTION

1. Field of the Invention

The present invention relates to a data transfer method of interconnecting electronic chips, such as IC chips, and a data transfer device.

2. Description of the Related Art

To enable configuration or the like of registers of a plurality of slave chips to be performed between one master chip and the slave chips, the master chip is connected to the slave chips by respective signal lines of address buses, signal lines of writing data buses, signal lines of reading data buses, and chip-selecting signal lines, for configuration of the registers (see Japanese Laid-Open Patent Publication (Kokai) No. 2001-142735).

Further, for resetting as well, reset pins are provided separately for the respective slave chips, and a plurality of signal lines for resetting signals are separately connected to the respective reset pins on a circuit board.

In this case, all the signal lines of the buses and the resetting signal lines need to be connected to the respective slave chips on the circuit board into which the slave chips are integrated.

This increases the numbers of signal lines of the address buses, the writing data buses, the reading data buses, the chip-selecting signals, and the resetting signals, in proportion to the number of slave chips to which they are connected.

Further, each slave chip needs to be provided with input and output pins for configuration of its registers, and a resetting pin, which increases the number of pins of the slave chip.

The initial settings of the slave chip, such as register settings, and various settings before execution of data processing need not be frequently changed, compared with the settings during execution of data processing, and can be sufficiently made at low setting speed.

Therefore, to make register settings between the master chip and the slave chips, the signal lines therefor need not be signal lines of buses, but in most cases, signal lines for serial communication are sufficient for this use.

Actually, however, signal lines of the buses are often used to connect the master chip and the slave chips, causing an increase in the number of lines of wiring and complication of the wiring.

Therefore, by minimizing the number of lines of wiring between the master chip and the slave chips in view of ease of wiring therebetween, the total number of lines of wiring of the whole system can be reduced and the whole system can be designed with ease.

Further, to reset the slave chips, it is necessary to provide resetting signal lines individually for the respective slave chips. Normally, resetting control is provided such that all the slave chips on the same circuit board are reset, but not such that only a selected specific chip is reset.

To control the resetting signals by a chip other than the master chip and the slave chips, resetting signal lines need to be provided separately for the respective slave chips to which the resetting signals are to be supplied, and the other chip needs to control the resetting signals supplied to the slave chips.

This necessitates provision of as many resetting signal lines as the slave chips to be reset, which causes an increase in the number of lines of wiring and complication of the wiring.

If the master chip can reset required one or more of the slave chips connected to the master chip, or all the slave chips, this enables reduction of the number of resetting signal lines and enables resetting only selected one or more of the slave chips.

Further, to serially transfer data from the master chip to the slave chips, the master chip needs to be connected to each slave chip, in one-to-one relationship, for the transfer of data.

In this case, to carry out writing of data into a register of each slave chip and reading of data therefrom, two signal lines i.e. one for transfer of data from the master chip to the slave chip, and the other for transfer of data from the slave chip to the master chip, are required at the minimum.

To transfer data directly from one master chip to all slave chips, it is necessary to provide as many signal lines for transfer of data from the master chip to the slave chips, and as many signal lines for transfer of data from the slave chips to the master chip as the number of the slave chips, and the master chip needs to control the transfer of data to each slave chip. Further, as many chip-selecting signal lines as the slave chips need to be connected from the master chip to the slave chips, to select which of the slave chips the master chip should access for writing or reading of data.

That is, for one master chip to transfer serial data to a plurality of slave chips, it is necessary to additionally provide a signal for selecting a slave chip (hereinafter referred to as "the chip select signal") used for discrimination of a slave chip to which the data is to be transferred, and assert the chip select signal in accessing the intended slave chip.

Further, as many signal lines for the chip select signal as the slave chips are required, which results in an increase in the number of signal lines.

The master chip cannot know the state of a signal level of each signal line via which the data is transferred from the master chip to the associated slave chip, and there is a possibility that noise is added to the signal line depending on the conditions of the circuit board and the wiring conditions of the signal line, whereby the signal level is changed due to the influence of the noise, causing an error in transfer of the data.

To overcome the problem of an error caused by noise in the data received by each slave chip, it is envisaged that the slave chip carries out parity error processing on the received data. In this case, depending on the setting of a parity bit, the processing can sometimes detect an error in the data, but the reliability of the processing is low.

More specifically, when communication by serial data is performed between the master chip and each slave chip, the slave chip determines an error condition of the serial data by parity check or the like, but depending on the bit position of an error, the error cannot be detected. Further, even when it is configured such that an interruption is caused to occur based on a parity error, if the parity error occurs frequently, the performance of a control section, such as a CPU, connected to the slave chip can be degraded due to the control section being interrupted each time the parity error occurs.

To overcome the problem, when the serial communication is executed between the master chip and each slave chip, to post the occurrence of an error to the master chip, there have been used a method of outputting an interruption signal from each slave chip to the master chip and a method of sending back the signal sent from the master chip to each slave chip as it is to the master chip.

In the case of the former method, an interruption signal is output from each slave chip to the master chip, and therefore it is necessary to provide as many interruption signal lines as the slave chips, which results in an increase in the number of signal lines and an increase in the number of pins.

In the case of the latter method, the status of the signal line transferring data from the master chip to the slave chips and the status of the signal line transferring data from the slave chip to the master chip are not the same. Therefore, an error occurs in the data being transferred from the master chip to the slave chip, and when the same data is sent back to the master chip, an error is caused by the influence of noise superposed on the data.

SUMMARY OF THE INVENTION

It is an object of the present invention to provide a data transfer method and a data transfer device, which are capable of transferring a predetermined amount of data in one transaction at only one time, and preventing the number of ports of a master chip and the number of signal lines connected between the master chip and slave chips from being increased.

To attain the above object, according to a first aspect of the present invention, there is provided a method of transferring data between a single master chip and a plurality of slave chips, comprising a connecting step of connecting the master chip and the slave chips that receive data transferred from the master chip, by a ring-like path, and a data transfer step of transferring the data from the master chip to the slave chips via the ring-like path.

With this configuration of the first aspect of the present invention, the master chip and the slave chips receiving data transferred from the master chip are connected to each other by the ring-like path, it is possible to transfer a predetermined amount of data in only one transaction, and prevent the number of ports of each slave chip and the number of signal lines connected to the slave chips from being increased.

Preferably, the slave chips have respective registers, and the data transfer step comprises transferring, as the data, information on writing in or reading from at least one of the registers, or resetting of at least one of the slave chips.

Preferably, the slave chips each receive the data transferred from the master chip, the data being handled as transactions in transaction units each formed by several bits, analyze each received transaction, and complete processing of the transaction by carrying out internal processing, such as writing or reading, on a register provided in the slave chip, or transferring the data as the transaction to a next one of the slave chips to finally transfer the data as the transaction to the master chip.

Preferably, the data transferred in the data transfer step comprises transactions, each of the transactions having at least one type of information on at least one of writing, reading, configuration, and resetting to be executed on at least one of the slave chips.

More preferably, the transactions include a command transaction containing information on a command, and data transaction containing information on data for a register, the command transaction and the data transaction being separately transferred to each of the slave chips.

Further preferably, the command transaction includes a first identifier for determining whether the transaction is for reading, writing, or configuration, a second identifier for determining whether the data is the command transaction or the data transaction, a third identifier for determining a data width of data of the data transaction, information on an address of the register for execution of the writing or the reading, and identifying information for discriminating between the slave chips.

Further preferably, the data transaction contains a fourth identifier whether the data transaction is for reading, writing, or configuration, a fifth identifier for determining whether the data is the command transaction or the data transaction, a sixth identifier for determining a data width of data of the data transaction, and information on data in the resister for execution of the writing or the reading.

Even more preferably, each of the slave chips is operable when receiving the command transaction, to read in the first identifier, the second identifier, the information on the address, and the identifying information, and perform processing on only a transaction to be processed, based on the first identifier, the second identifier, the address information, and the identifying information.

More preferably, when each of the slave chips receives a transaction for writing, at least one of the slave chips that is to process the transaction for writing, writes the data in the register provided therein, and transfers the transaction for writing to a next one of the slave chips in parallel with the writing, and the other slave chips than the slave chip that is to process the transaction for writing transfer the transaction for writing to a next one of the slave chips or the master chip without stopping the transfer of the transaction for writing therein.

With this configuration, it is possible to increase the transfer rate of transactions for writing.

Further preferably, the master chip is capable of issuing a next transaction before the transaction for writing issued to at least one of the slave chips returns to the master chip.

More preferably, the transactions include a transaction for reading data from the register provided in at least one of the slave chips that is to process the transaction, and the slave chips each receive a command transaction for reading contained in the transaction for reading, determine whether the received command transaction is to be processed by the slave chip, and transfer the command transaction for reading to a next one of the slave chips in parallel with the determination, and the next slave chip, if it is to process the received command transaction for reading, reads the data from the register provided therein, and transfers the data read from the register to a next one of the slave chips as a data transaction for reading, the command transaction for reading and the data transaction, which have been transferred, being finally transferred to the master chip, the master chip determining that processing of the transaction for reading is completed at a time point reception of the data transaction for reading is completed.

Further, the master chip does not issue a next transaction for reading until the master chip determines that processing of the transaction for reading is completed.

Even more preferably, the method comprises an issuing step of causing the master chip to issue a transaction for configuration to the slave chips, and an adding step of assigning respective numbers to the slave chips, by the transaction for configuration, and adding the numbers to information in the command transaction as the identifying information.

Still further preferably, the master chip is capable of performing configuration on each of the slave chips any number of times by issuing the transaction for configuration.

Preferably, the data transferred in the data transfer step comprises transactions, each of the transactions having a data width of a predetermined unit, the method comprising a determining step of determining whether a valid transaction has been transferred by managing all the transactions in units of the data width.

More preferably, the determining step comprises always placing a leading one data bit of each valid transaction in a high state, and always placing a leading one data bit of each invalid transaction in a low state, to determine a start point of the valid transaction in managing the transactions in units of the data width.

With this configuration, it is possible to easily determine the start point of each valid transaction.

Preferably, the leading one data bit is one bit of serial data.

To attain the above object, in a second aspect of the present invention, there is provided a method of transferring data and a synchronizing clock used for transfer of the data between a single master chip, and a first slave chip and a second slave chips, comprising a connecting step of connecting the master chip, the first slave chip that receives the data transferred from the master chip according to the synchronizing clock, and the second slave chip that receive the data transferred from the first slave chip according to the synchronizing clock, by a ring-like path, and a data transfer step of transferring the data from the master chip to the first and second slave chips via the ring-like path.

With this configuration of the second aspect of the present invention, it is possible to obtain the same advantageous effects as provided by the first aspect of the present invention.

Preferably, the first and second slave chips have respective registers, and the data transfer step comprises transferring as the data information on writing in or reading from at least one of the slave chips, or on resetting of at least one of the slave chips.

Preferably, the first and second slave chips receive the data transferred from the master chip, the data being all handled as transactions in units of transactions each formed by several bits, analyze each received transaction, and complete processing of the transaction by carrying out internal processing, such as writing, reading, or resetting, on a register provided in the slave chip, or transferring the data as the transaction to a next one of the slave chips to finally transfer the data as the transaction to the master chip.

Preferably, the method comprises a storage step of storing a transfer state of the data transferred from the master chip to the first and second slave chips in the first and second slave chips.

More preferably, the transfer state of the data represents reliability of a signal line for transferring the data, dependent on noise superposed on the data being transferred along the signal line depending on a transfer condition of the data.

More preferably, the method comprises a reading step of causing the master chip to read the transfer state of the data stored in the first and second slave chips from the master chip, by a method selected from the group consisting of a first method of reading the transfer state of the data stored in the first and second slave chips in a same manner as reading from the registers provided in the first and second slave chips, and a second method of outputting information on the transfer state, from the first and second slave chips, using a signal line other than the signal line connecting between the first and second slave chips.

More preferably, the method comprises a reading step of causing the master chip to read the transfer state of the data stored in the first and second slave chips from the master chip, and a transfer speed lowering step of lowering a speed of transfer of the data when the read transfer state of the data is in an error condition, to thereby improve the transfer state of the data.

Further preferably, the method comprises a reading step of causing the master chip to read the transfer state of the data stored in the first and second slave chips, and when the read transfer state of the data is in an error condition, in the data transfer step, it is judged that reliability of data during data transfer is low, and the data is transferred again.

With this configuration, it is possible to improve the reliability of data transfer.

More preferably, the transfer state of the data stored in the first and second slave chips is determined based a state of data synchronized with a leading edge of a synchronizing clock used for transfer of the data, and a state of data synchronized with a leading edge of a clock inverted from the synchronizing clock for the transfer of the data.

More preferably, the method comprises a selecting step of selecting whether to cause the master chip to read the transfer state of the data stored in the first and second slave chips, by a user controlling reading by the master chip.

Preferably, the data transferred in the data transfer step comprises transactions, each of the transactions having at least one type of information on at least one of writing, reading, configuration, and resetting to be executed on at least one of the first and second slave chips.

More preferably, the transactions include a command part containing information on a command, and a data part containing information on data for a register, and the command part and the data part being separately transferred to the first and second slave chips.

Further preferably, the command part includes a first identifier for determining whether the transaction is for reading, writing, configuration, or resetting, a second identifier for determining whether the data is the command part or the data part of the transaction, a third identifier for determining a data width of data of the data part, information on an address of the register for execution of the writing or the reading, and identifying information for discriminating between the first and second slave chips.

Further preferably, the data part includes a fourth identifier for determining whether the transaction is for reading, writing, configuration, or resetting, a fifth identifier for determining whether the data is the command part or the data part of the transaction, a sixth identifier for determining whether data width of data of the data part, and information on data for the register for execution of the writing or the reading.

Even more preferably, the first and second slave chips are each operable when receiving the command part of the transaction, to read in the first identifier, the second identifier, the information on the address, and the identifying information, and perform processing on only a transaction to be processed, based on the first identifier, the second identifier, the address information, and the identifying information.

More preferably, when the first and second slave chips each receive a transaction for writing, at least one of the slave chips that is to process the transaction for writing, writes the data in the register provided therein, and transfers the transaction for writing to a next one of the slave chips in parallel with the writing, and the other slave chip than the slave chip that is to process the transaction for writing transfers the transaction for writing to a next one of the first and second slave chips or the master chip without stopping the transfer of the transaction for writing thereat.

With this configuration, it is possible to increase the transfer rate of transactions for writing.

Further preferably, the master chip is capable of issuing a next transaction before the transaction for writing issued to at least one of the first and second slave chips returns to the master chip.

More preferably, the transactions include a transaction for reading data from the register provided in at least one of the slave chips that is to process the transaction, and wherein the first and second slave chips each receive a command part for reading contained in the transaction for reading, determine whether the received command part for reading is to be processed by the slave chip, and transfer the command part for reading to a next one of the slave chips in parallel with the determination, and the next slave chip, if it is to process the received transaction for reading reads the data from the register provided therein, and transfers the data read from the register to a next one of the slave chips as a data part of the transaction for reading, and wherein the command part for reading and the data part, which have been transferred, are finally transferred to the master chip, the master chip determining that processing of the transaction for reading is completed at a time point reception of the data part for reading is completed.

Further preferably, the master chip does not issue a next transaction for reading until the master chip determines that processing of the transaction for reading is completed.

Even more preferably, the method comprises an issuing step of causing the master chip to issue a transaction for configuration to the first and second slave chips, and an adding step of assigning respective numbers to the first and slave chips, by the transaction for configuration, and adding the numbers to information in the command part as the identifying information.

Still further, the master chip is capable of performing configuration on each of the first and second slave chips any number of times by issuing the transaction for configuration.

Even more preferably, the method comprises a selecting step of causing the master chip to select one of the first and second slave chips which is to be reset, using the identifier information added in the transaction for configuration, and a resetting step of causing the master chip to reset only the slave chip to be reset, by adding the identifier information together with an identifier for identifying the transaction for resetting, to the command part of the transaction.

Preferably, the data transferred in the data transfer step comprises transactions, each of the transactions having a data width of a predetermined unit, the method comprising a determining step of determining whether a valid transaction has been transferred by managing all the transactions in units of the data width.

More preferably, the determining step comprises always placing a leading one data bit of each valid transaction in a high state, and always placing a leading one data bit of each invalid transaction in a low state, to determine a start point of the valid transaction in managing the transactions in units of the data width.

Further preferably, the leading one data bit is one bit of serial data.

To attain the above object, in a third aspect of the present invention, there is provided a data transfer device comprising a single master chip, a plurality of slave chips that receive data transferred from the master chip, a connecting path that connects the master chip and the slave chips in a ring, and a data transfer unit that transfers the data from the master chip to the slave chips via the connecting path.

To attain the above object, in a fourth aspect of the present invention, there is provided a data transfer device comprising a single master chip, a first slave chip that receives data transferred from the master chip according to a synchronizing clock transferred from the master chip, a second slave chip that receives the data transferred from the first slave chip according to the synchronizing clock, a connecting path that connects the master chip, the first slave chip, and the second slave chip in a ring, and a data transfer unit that transfers data from the master chip to the first and second slave chips the connecting path.

The above and other objects, features, and advantages of the invention will become more apparent from the following detailed description taken in conjunction with the accompanying drawings.

DETAILED DESCRIPTION OF THE PREFERRED EMBODIMENTS

Figure 1:
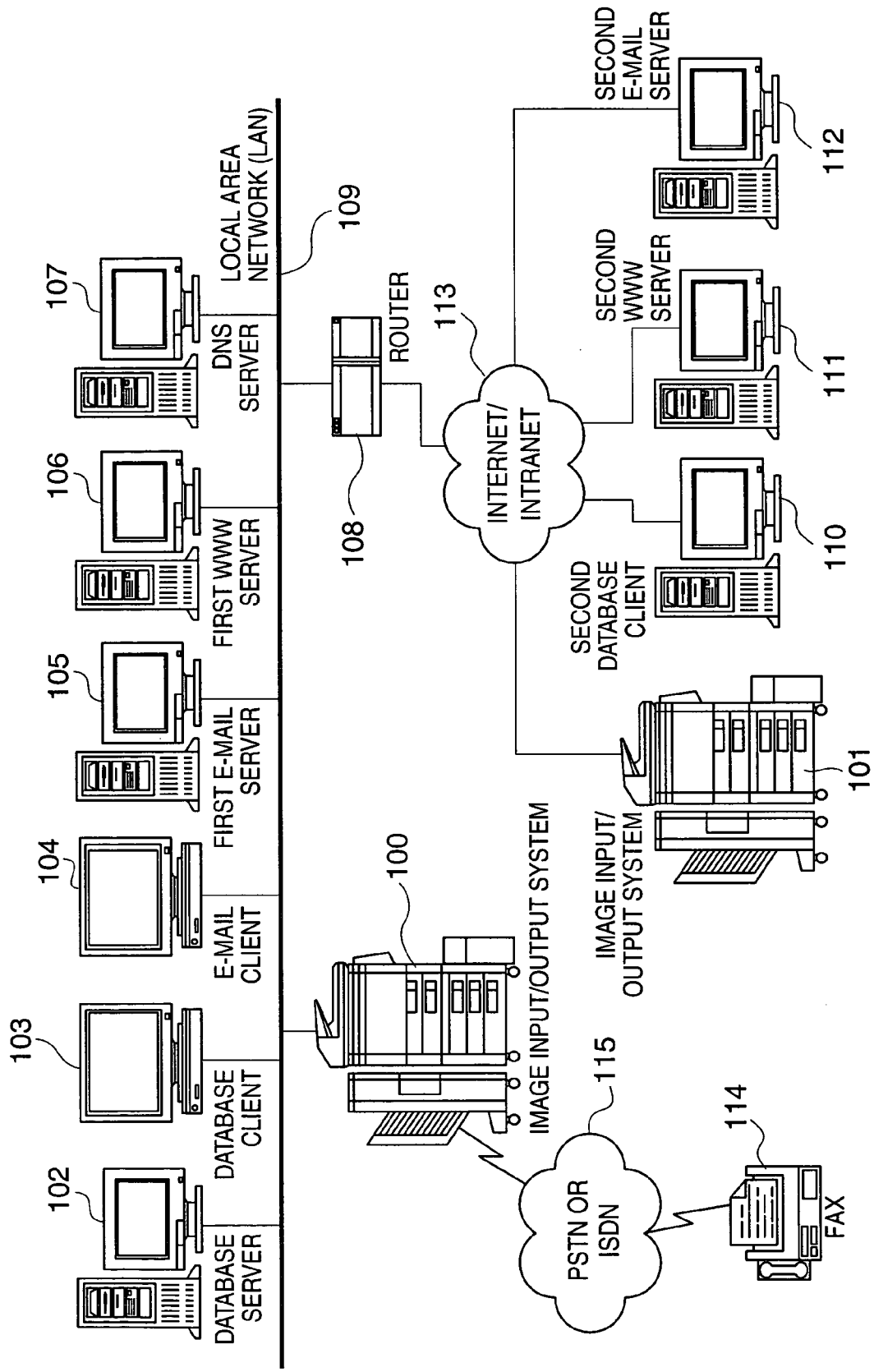
FIG. 1 is a block diagram showing the arrangement of a system including a data transfer device according to a first embodiment of the present invention.

The present invention will now be described in detail with reference to the drawings showing preferred embodiments thereof. In the drawings, elements and parts which are identical throughout the views are designated by identical reference numerals, and duplicate description thereof is omitted.

In the following, the embodiments of the present invention will be described with reference to the drawings.

First of all, a description will be given of a first embodiment of the present invention with reference to FIGS. 1 to 7.

In the present embodiment, to solve the above-described problems with the prior art, two or more slave chips are connected in a ring to a single master chip by two signal lines, i.e. a serial data signal line and a transfer synchronizing clock line. It is configured such that on the serial data signal line information on register data is transferred and information on serial data on the serial data signal line is sequentially transferred from one slave chip to another, to finally return to the master chip.

Similarly to the serial data signal line, it is configured such that on the transfer synchronizing clock line a clock signal transmitted from the master chip is sequentially transferred from one slave chip to another, to finally return to the master chip.

The master chip and the slave chips receive and transmit the serial data on the serial data signal line in a manner synchronized with the clock signal on the transfer synchronizing clock line.

The master chip handles all serial data transferred to the slave chips in units of unitary transactions each formed by several bits, and determines on a unitary transaction-by-unitary transaction basis whether or not each serial data is valid.

In transfer of serial data in units of unitary transactions, to determine the start point of each valid unitary transaction, the master chip always places only the leading one bit thereof in a H (High) state, but always places the first bit of each invalid unitary transaction in a L (Low) state. This enables the start point of each valid unitary transaction to be determined, and when serial data has been transferred by the number of bits to be handled as one unit of a unitary transaction, it is determined that transfer of the unitary transaction is completed.

When a bit error occurs in a unitary transaction during transfer of serial data in units of unitary transactions between the master chip and the slave chips, and the unitary transaction comes to contain improper data information, error control is executed in each of the slave chips so as to prevent the improper data information from being written in a register or the like of the slave chip.

In the error control, the master chip adds a parity bit to data in each unitary transaction, and then transfers the data to the slave chips. Upon reception of each unitary transaction data, the slave chips perform a parity check on the parity bit to determine whether or not the parity bit added to the data by the master chip matches the parity bit of the received data, thereby detecting an erroneous transaction.

In the error control, parity checking is performed not only by each of the slave chips, but also by the master chip on the serial data returned from the slave chips through transfer along the ring-like signal line on a unitary transaction-by-unitary transaction basis.

In the error control, when a slave chip detects an erroneous transaction, the slave chip recognizes that improper data information exists in the transaction, and immediately transfers the transaction data to the next slave chip or the master chip without writing or reading the transaction data in its register or the like.

In the error control, when the master chip detects an erroneous transaction, the master chip recognizes that improper data information exists in the transaction, and displays an error message concerning the transaction data to provide an external notification that transfer of the transaction has failed.

Serial data is divided into command data for discriminating the type of transfer, and data to be transferred, and the former is handled as a transaction of command data (hereinafter referred to as the command transaction or the command part), and the latter as a transaction of data (hereinafter referred to as the data transaction or the data part).

Further, to identify each of the slave chips, the master chip issues a configuration transaction to the slave chips to thereby assign a unique number to each of the slave chips and uses this number as a chip ID (identifier) for identifying the associated slave chip.

The command transaction includes an identifier for discrimination between the data transaction and the command transaction (hereinafter referred to as the C/D identifier), an identifier for discrimination between a write transaction and a read transaction (hereinafter referred to as the W/R identifier), an identifier for identifying the transfer width of data (hereinafter referred to as the bit mode), the identifier as the chip ID for identifying a slave chip (hereinafter referred to as the chip ID), and information on a read or write address.

The data transaction includes the C/D identifier, the W/R identifier, Bit Mode, chip ID and information on data to be read or written.

To write data in a predetermined register within a specific one of the slave chips, the master chip issues a command transaction to the specific slave chip, and then a data transaction in succession thereto.

In this case, the command transaction includes the C/D identifier which is activated (it is assumed that the C/D identifier is, for example, activated during a command transaction, and deactivated during the data transaction), the W/R identifier which is activated (it is assumed that the W/R identifier is, for example, activated during a write transaction, and deactivated during a read transaction), the bit mode which is set to predetermined data width information, the chip ID which is set to a predetermined value (a configuration value of the intended slave chip), and information on the set address value of the predetermined register.

The data transaction includes the C/D identifier which is deactivated, the W/R identifier which is activated, the bit mode which is set to the predetermined data width information, and information on the set value of the data to be written in the predetermined register.

In this case, even before the write transaction issued by the master chip returns to the master chip via the slave chips, the master chip issues write transactions successively.

Therefore, insofar as a write transaction is concerned, the master chip does not check from the write transaction whether or not data has been written in the intended one of the slave chips. The master chip having received a transaction sent from the slave chips through the ring-like signal line only determines whether or not any parity error has occurred in the transaction (any one of the unitary transactions thereof).

On the other hand, each of the slave chips receives the transactions transferred from the master chip or the immediately preceding slave chip, and reads the identifiers and the information on data configuration from the transactions to determine whether or not each of the received transactions should be processed. If the received transaction should be processed, the data is written in the register of the slave chip. Transactions which are not to be processed by the slave chip are sequentially passed to the next slave chip or the master chip.

This enables the master chip to write data in the register of a slave chip into which data is desired to be written.

To read data in a register of a specific one of the slave chips, the master chip issues a command transaction to the specific slave chip.

In this case, the command transaction includes the C/D identifier which is activated, the W/R identifier which is deactivated, the bit mode which is set to predetermined data width information, the chip ID which is set to a predetermined value (a configuration value of the intended slave chip), and information on the set address value of the predetermined register.

In this case, before the read command transaction issued by the master chip returns to the master chip via the slave chips, and the master chip completes reception of a read data transaction issued by the slave chip which has carried out processing of the read command transaction, the master chip does not issue the next transaction.

With regard to a read transaction operation, while a read command transaction transferred from the master chip is received by each slave chip and transferred from the slave chip to the next slave chip or the master chip, a read data transaction is issued by one of the slave chips which has carried out processing of the read command transaction.

After having received the read command transaction, the master chip receives the read data transaction. The master chip is held in a wait state for receiving the read data transaction until completion of reception thereof. After completing the reception of the read data transaction, the master chip starts a transfer operation for the next transaction.

Each slave chip receives each transaction transferred from the master chip or the immediately preceding slave chip, and reads the identifiers and the information on data configuration from the transaction to determine whether or not the received transaction should be processed. According to the transaction which should be processed, the slave chip reads data from its register.

The slave chip that determines itself to process the transaction transfers the read data transaction based on the data read from the register.

The slave chip that determines itself to process the transaction adds the identifiers and information on data configuration required for issuing the read data transaction to the data read from the register, to thereby issue the read data transaction.

When a read command transaction transferred to a slave chip is not one to be processed by the slave chip, the slave chip passes the read command transaction to the next slave chip without processing the same.

After the master chip transmits a read command transaction to the slave chips, it receives the read command transaction having being transferred through the slave chips, and then receives a read data transaction. Therefore, when receiving the read command transaction, the master chip can determine, based on the chip ID, a slave chip that has performed data reading, and determine, based on address information, the address of the register from which data has been read. When receiving the read data transaction, the master chip can determine the data values of the register from which the data have been read, based on the information on the read data transaction.

This enables the master chip to read data from the register of a slave chip from which data is desired to be read.

In the following, a detailed description will be given of the present embodiment with reference to the drawings.

FIG. 1 is a block diagram showing the arrangement of a data processing system including a data transfer device according to the present embodiment. In FIG. 1, reference numeral 100 designates a first image input/output system, 101 a second image input/output system, 102 a first database server, 103 a database client, 104 an electronic mail client, 105 a first electronic mail server, 106 a first WWW server, 107 a DNS server, 108 a router, 109 a LAN (local area network), 110 a second database server, 111 a second WWW server, 112 a second electronic mail server, 113 the Internet/Intranet, 114 a facsimile (FAX), and 115 a PSTN (public switched telephone network) or an ISDN (integrated service digital network).

The first image input/output system 100, the first database server 102, the database client 103, the electronic mail client 104, the first electronic mail server 105, the first WWW server 106, the DNS server 107, and the router 108 are connected to the LAN 109.

The second image input/output system 101, the second database server 110, the second WWW server 111, and the second electronic mail server 112 are connected to the Internet/Intranet 113. Further, the router 108 is connected to the Internet/Intranet 113.

Figure 2:
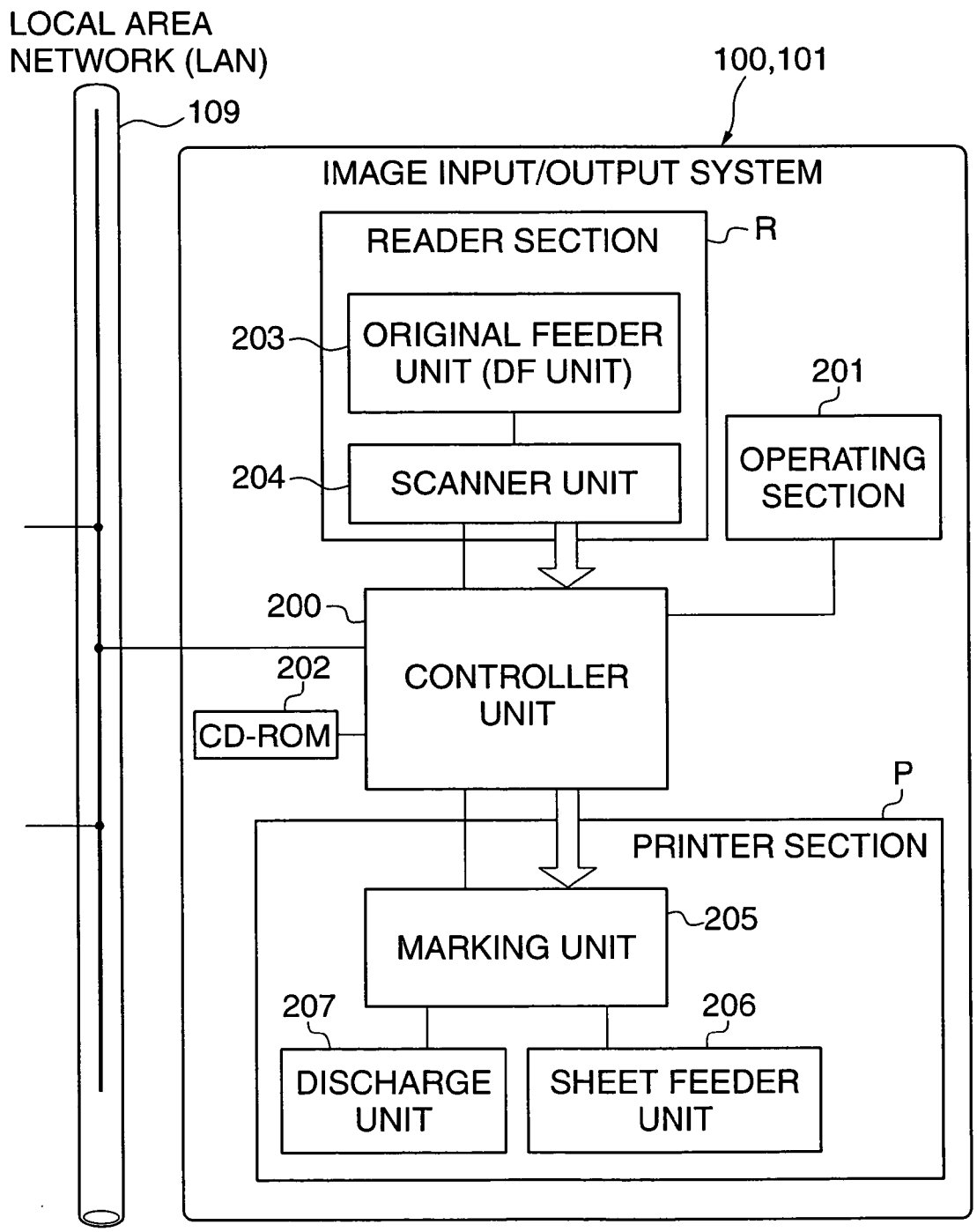
FIG. 2 is a block diagram showing the whole arrangement of an image input/output system applied to the system in FIG. 1.

FIG. 2 is a block diagram showing the arrangement of the image input/output system 100 (101). As shown in FIG. 2, the image input/output system 100 (101) is comprised of a reader section R, a printer section P, a controller unit 200, an operating section 201, and a recording section (CD-ROM) 202. The reader section R, the printer section P, the operating section 201, and the recording section 202 are connected to the controller unit 200.

When execution of a print job is instructed from any of the servers 102, 105, 106, 107, 110, 111, and 112, the print job and image data are delivered to the image input/output system 100 (101) via the LAN 109. The image data can be printed out by the printer section P of the image input/output system 100 (101), or it is also possible to send images read by the reader section R onto the LAN 109.

Further, it is possible to transmit images read by the reader section R to the PSTN or ISDN 115 by FAX transmission means, not shown, as well as to print out images received from the PSTN or ISDN 115, by the printer section P.

The reader section R optically reads an original image and converts the same into image data. The reader section R is comprised of an original feeder unit (DF unit) 203 equipped with the function of conveying original sheets, and a scanner unit 204 equipped with the function of reading originals.

The printer section P conveys recording sheets and prints image data as visible images on the recording sheets, followed by discharging the sheets out of the apparatus. The printer section P is comprised of a marking unit 205 equipped with the function of transferring and fixing image data onto recording sheets, a sheet feeder unit 206 having a plurality of types of recording sheet cassettes, and a discharge unit 207 equipped with the functions of sorting and stapling printed recording sheets and then discharging these out of the apparatus.

The controller unit 200 is electrically connected to the reader section R and the printer section P. Further, the controller unit 200 is connected to the LAN 109, the PSTN or ISDN 115, and a network, such as the Internet/Intranet 113. The controller unit 200 provides the copy function of controlling the reader section R to read original image data and controlling the printer section P to output print data and image data onto recording sheets, the printer function of receiving a control signal through an interface for short-distance radio communication to control the printer section P to output print data and image data onto recording sheets, for execution of a printer job from the LAN 109, the printer function of converting code data received via the LAN 109 into image data and outputting the image data to the printer section P, and the scanner function of converting image data read by the reader section R into code data and transmitting the code data to a PC (personal computer) or the like via the LAN 109.

The operating section 201 is electrically connected to the controller unit 200 and implemented e.g. by a liquid crystal touch panel. The operating section 201 provides a user interface for operating the image input/output system 100 (101).

The database servers 102 and 110 manage, as a database, binary image data and multi-valued image data read by the image input/output systems 100 and 101.

Figure 3:
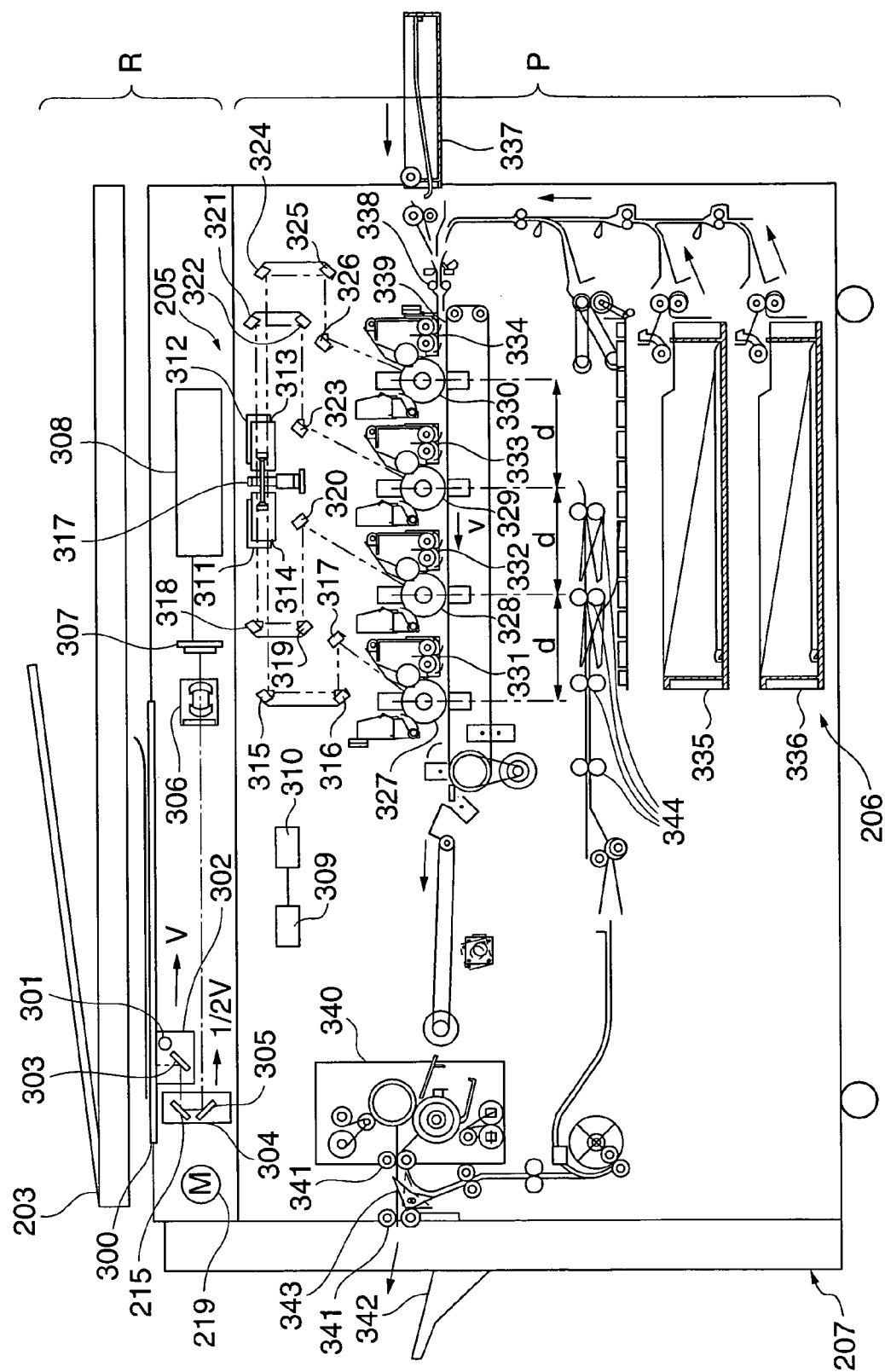
FIG. 3 is a side cross-sectional view of the internal construction of a reader section and a printer section of the image input/output system.

FIG. 3 is a side cross-sectional view schematically showing the internal construction of the reader section R and the printer section P. In FIG. 3, the original feeder unit 203 of the reader section R sequentially feeds originals one by one from the leading page onto a platen glass 300, and discharges each original from the platen glass 300 after completion of an original reading operation. When an original is fed onto the platen glass 300, a lamp 301 is turned on, and movement of an optical unit 302 is started, for exposure and scanning of the original. Reflected light from the exposed and scanned original is guided to a CCD image sensor (hereinafter simply referred to as "the CCD") 307 by mirrors 303, 304, and 305 and a lens 306. Thus, an image on the scanned original is read by the CCD 307.

A reader image processing section 308 carries out predetermined processing on image data output from the CCD 307, and outputs the processed image data to the controller unit 200 (see FIG. 2).

A printer image processing section 309 outputs image signals sent from the controller unit 200 to a laser driver 310.

The laser driver 310 of the printer section P drives laser light-emitting sections 311, 312, 313, and 314 to cause the laser light-emitting sections 311 to 314 to emit laser light according to image data output from the printer image processing section 309. The laser light is irradiated onto photosensitive drums 327, 328, 329, and 330 by mirrors 315, 316, 317, 318, 319, 320, 321, 322, 323, 324, 325, and 326, whereby latent images are formed on the respective photosensitive drums 327 to 330 according to the laser light. Reference numerals 331, 332, 333 and 334 designate developing devices for developing the latent images by black (Bk) toner, yellow (Y) toner, cyan (C) toner, and magenta (M) toner, respectively. After development by the developing devices 331 to 334, the toner images of the respective colors are transferred onto a recording sheet for full-color printout.

A recording sheet fed from one of sheet cassettes 335 and 336 and a manual feed tray 337 of the sheet feeder unit 206 in timing synchronous with the start of irradiation of the laser light passes through a registration roller pair 338 to be attracted onto a transfer belt 339 and conveyed by the transfer belt 339. Then, a developer attached to the photosensitive drums 327 to 330 is transferred onto the recording sheet. The recording sheet having the developer transferred thereon is conveyed to a fixing section 340, and the developer is fixed onto the recording sheet by heat and pressure of the fixing section 340. The recording sheet having passed through the fixing section 340 is discharged by a discharge roller pair 341 onto a discharge tray 342. The discharge unit 207 bundles and sorts discharged recording sheets, and staples the sorted recording sheets.

When a double-sided recording mode is set, the recording sheet is conveyed to the discharge roller pair 341, and then the direction of rotation of the discharge roller pair 341 is reversed such that the recording sheet is guided to a re-feeding conveying path 344 by a flapper 343. The recording sheet guided to the re-feeding conveying path 344 is fed to the transfer belt 339 in the above-mentioned timing.

Figure 4:
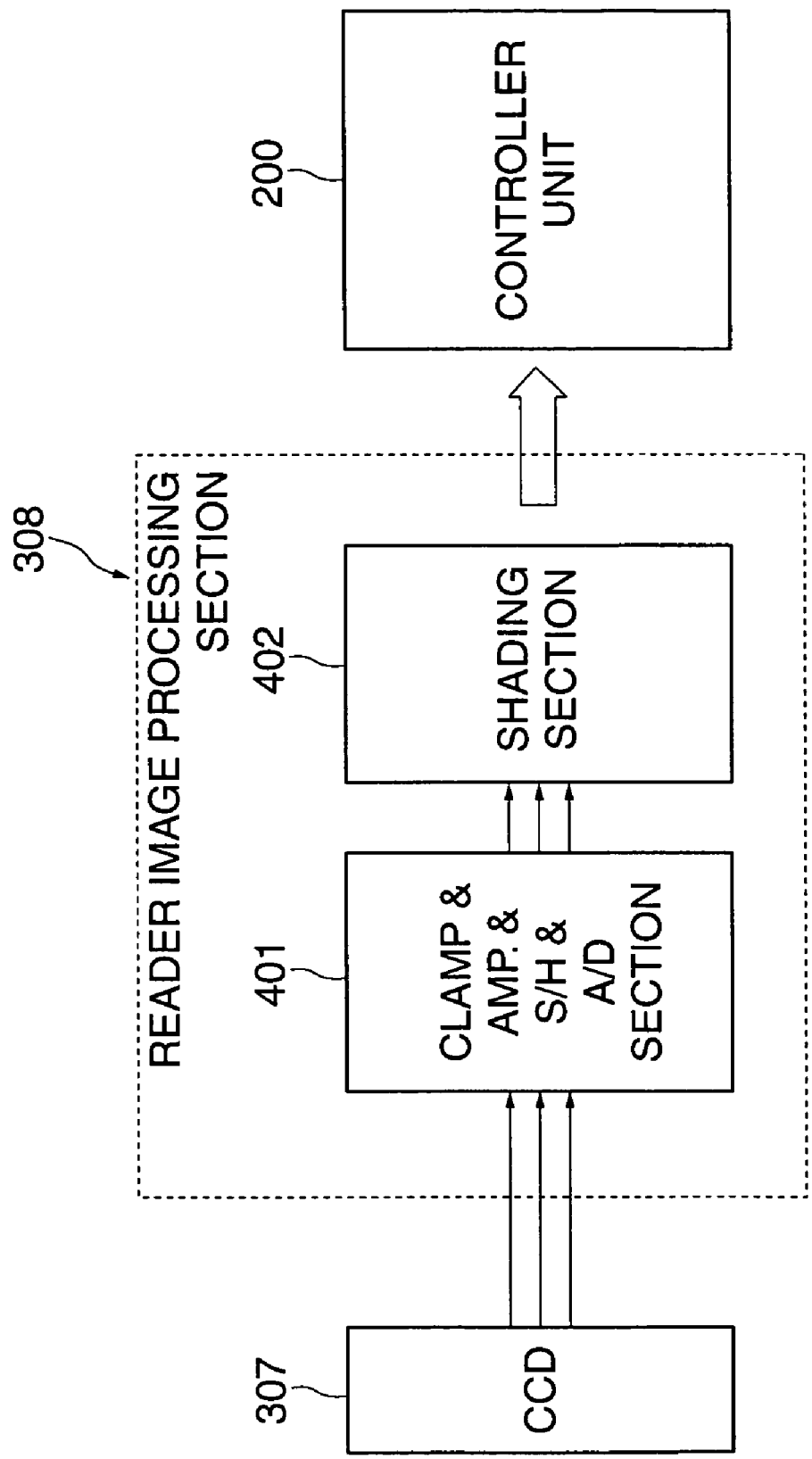
FIG. 4 is a block diagram showing the arrangement of a reader image preprocessing section of the image input/output system.

FIG. 4 is a block diagram showing details of the arrangement of the reader image processing section 308.

In the reader image processing section 308, the CCD 307 reads an original on the platen glass 300 by light reflected therefrom, and converts the reflected light into electric signals (if the CCD 307 is a color sensor, R, G, and B color filters may be mounted on one CCD line in an inline form in the order of R, G, and B, or R, G, and B filters may be arranged on three CCD lines side by side. Alternatively, on-chip filters may be used, or filters may be formed separately from the CCD). Then, the electric signals (analog image signals) are input to the reader image processing section 308. A clamp & Amp. & S/H & A/D section 401 sample-holds (S/H) the analog image signals, clamps the dark level of each analog image signal to a reference potential, amplifies the signal to a predetermined level (the processing order is not limited to that represented by the section name of the clamp & Amp. & S/H & A/D section 401), and A/D converts the processed analog image signals into R, G, and B digital signals each consisting e.g. of eight bits. The R, G, and B digital signals are subjected to shading correction and black correction by a shading section 402, followed by being output to the controller unit 200.

Next, a description will be given of the functions of the controller unit 200 with reference to FIGS. 5 and 6.

Figure 5:
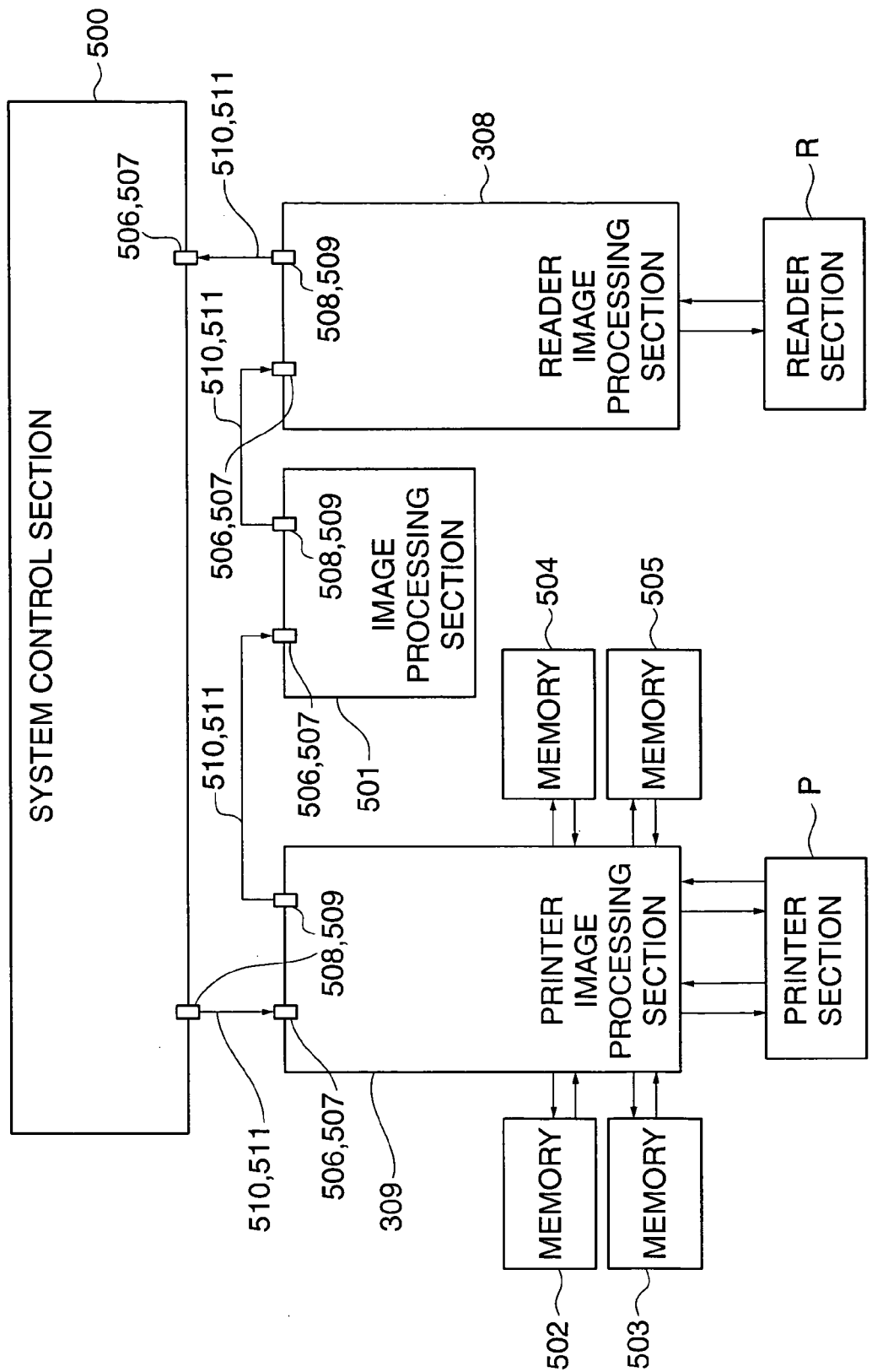
FIG. 5 is a block diagram schematically showing the internal arrangement of a controller unit of the image input/output system.
Figure 6:
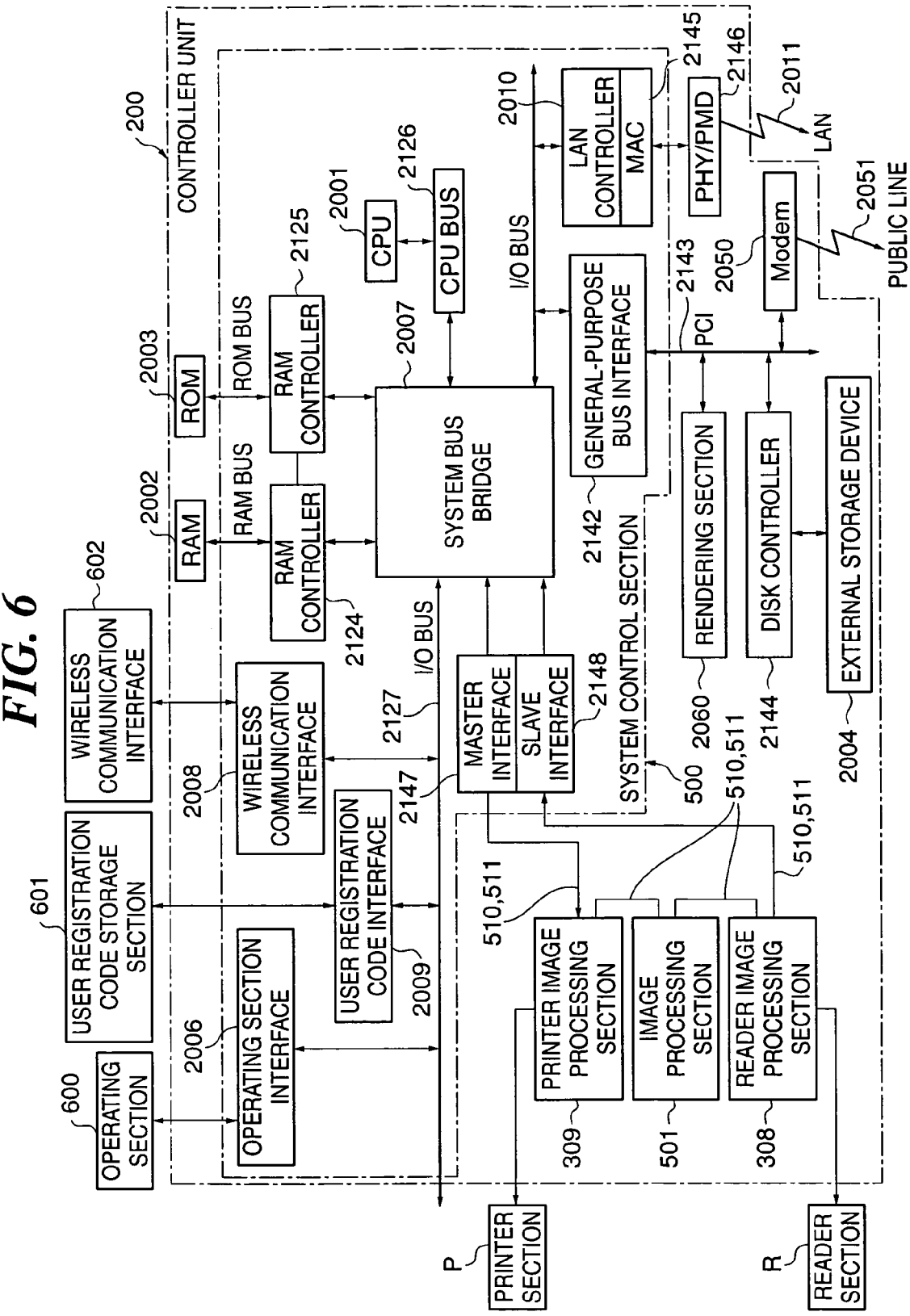
FIG. 6 is a block diagram showing in detail the internal arrangement of the controller unit of the image input/output system.

FIG. 5 is a block diagram showing the internal arrangement of the controller unit 200, and FIG. 6 is a block diagram showing the internal arrangement of a system controller 500.

In FIG. 5, reference symbol P designates the printer section, reference symbol R the reader section, reference numeral 308 the reader image processing section, 309 the printer image processing section, 500 the system controller, 501 an image processing section, 502 to 505 memories, 506 a serial data-receiving port, 507 a synchronizing clock port for serial data reception, 508 a serial data-transmitting port, 509 a synchronizing clock port for serial data transmission, 510 a serial data signal line, and 511 a synchronizing clock signal line.

The system controller 500 controls the overall operation of the controller unit 200, and is formed by a single chip. The reader image processing section 308, the printer image processing section 309, and the image processing section 501 are formed by respective different chips, and connected to the system controller 500. These sections 308, 309 and 501 transmit and receive image data and control signals to execute data processing.

Each of the reader image processing section 308, the printer image processing section 309, the image processing section 501, and the system controller 500 is equipped with the function of transmitting and receiving one-bit serial data for register setting and has chip ports for transmission and reception.

The chip ports function as the serial data-receiving port 506, the synchronizing clock port 507 for serial data reception, the serial data-transmitting port 508, and the synchronizing clock port 509 for serial data transmission.

The ports for serial data of each of the system controller 500, the printer image processing section 309, the image processing section 501, and the reader image processing section 308 are connected in a ring by signal lines, i.e. the serial data signal line 510 and the synchronizing clock signal line 511, which are paired to interconnect the chips.

The system controller 500 is the master chip for transfer of serial data, while each of the printer image processing section 309, the image processing section 501, and the reader image processing section 308 is a slave chip for transfer serial data.

In FIG. 6, reference numeral 600 designates an operating section, 601 a user registration code storage section, 602 a radio communication interface, 200 the, controller unit, and 500 the system controller.

The system controller 500 has an operating section interface 2006, a user registration code interface 2009, and a radio communication interface 2008.

A master interface 2147 and a slave interface 2148 within the system controller 500 provide interface for transmission/reception of the serial data to/from the printer image processing section 309, the image processing section 501, and the reader image processing section 308. The master interface 2147 is connected to the printer image processing section 309 by the serial data signal line 510 and the synchronizing clock signal line 511, and also connected to a system bus bridge 2007. On the other hand, the slave interface 2148 is connected to the reader image processing section 308 by the serial data signal line 510 and the synchronizing clock signal line 511, and also connected to the system bus bridge 2007.

The memories 502 to 505 appearing in FIG. 5 are provided for controlling the delay amount of image data on the respective photosensitive drums for a printer in the printer section P. The memories 502 to 505 correspond to the respective color components (Y, M, C, and K), and are capable of storing several pages of image data of the respective color components. In the present embodiment, each of the memories is implemented by a SDRAM.

The image processing section 501 is an image processing block for carrying out image processing for the printer and the reader.

The controller unit 200 in FIG. 6 is connected not only to the reader section R as an image input device, the reader processing section 308 (see FIG. 3), and the printer section P as an image output device, but also to networks, such as a LAN 2011 and a public line (WAN) 2051, for input/output of image information and device information and image development of PDL data.

A CPU 2001 is a processor for controlling the overall operation of the system. The CPU 2001 is connected to a CPU bus 2126, and further to the system bus bridge 2007 via the CPU bus 2126.

The operating section interface 2006 is an interface section for providing interface with the operating section 600, to output image data to be displayed on the operating section 600 to the operating section 600.

A RAM (random access memory) 2002 and a ROM (read-only memory) 2003 are provided as memories used by the CPU 2001 for storing processed data. Access to the RAM 2002 and the ROM 2003 is controlled by a RAM controller 2124 and a ROM controller 2125, respectively.

Reference numeral 2004 designates a hard disk drive (HDD) as an external storage device. The HDD 2004 stores system software, information on a print job, and image data. Access to the HDD 2004 is controlled by a disk controller 2144 using a PCI bus 2143 via a general-purpose bus interface 2142.

A LAN controller 2010 is connected to the LAN 2011 (corresponding to the LAN 109 in FIG. 1) via a MAC circuit 2145 and a PHY/PMD circuit 2145, for input/output of information.

Reference numeral 2127 designates an I/O bus, 2050 a modem, and 2060 a rendering section.

The controller unit 200 is configured to have a control function for performing serial data transfer using the serial data signal line 510 and the synchronizing clock signal line 511 each connecting the system controller 500, the printer image processing section 309, the image processing section 501, and the reader image processing section 308 to one another in a ring.

Figure 7:
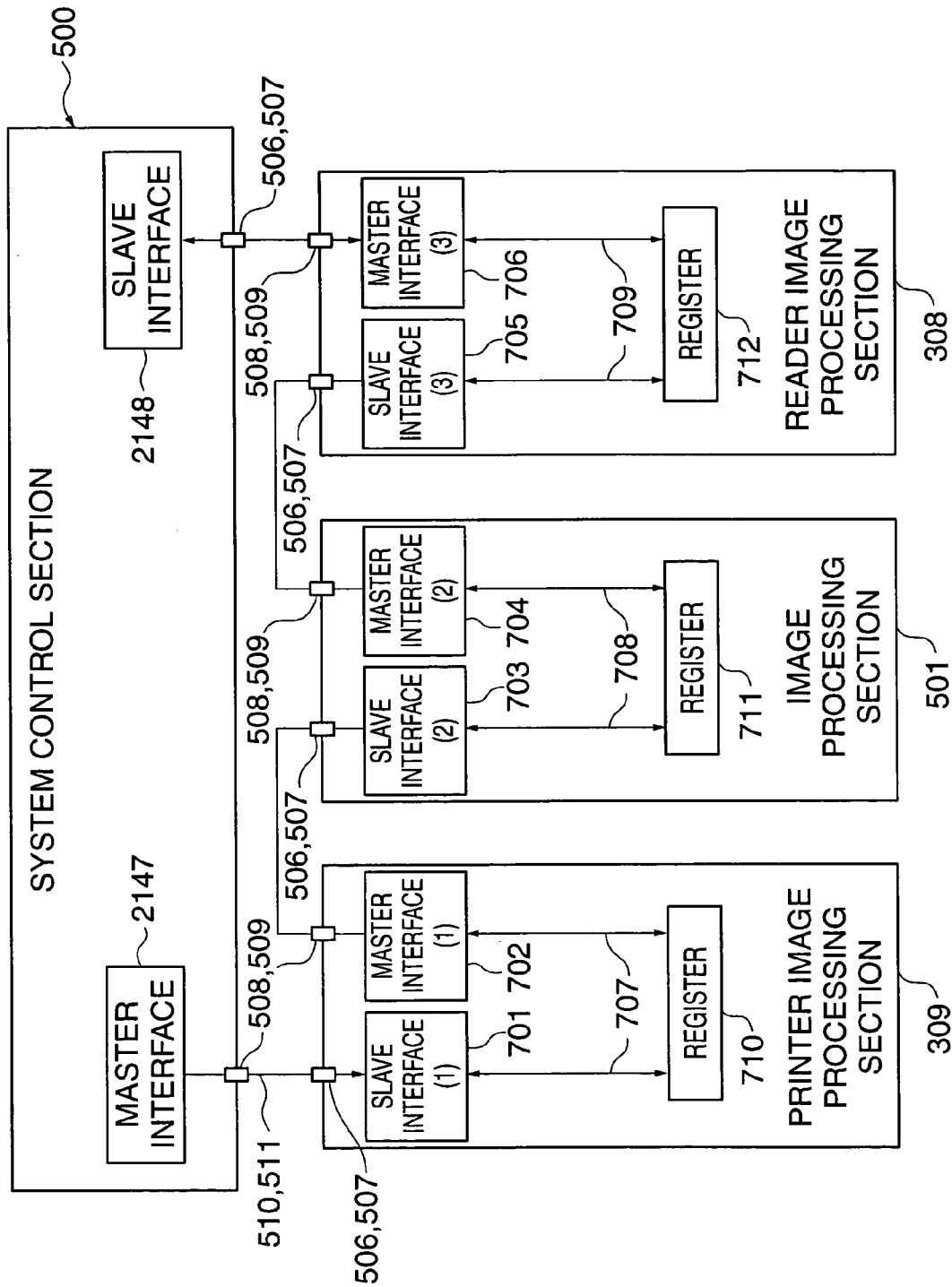
FIG. 7 is a diagram showing the configuration for serial data transfer between a plurality of chips included in the data transfer device.

FIG. 7 is a diagram useful in explaining the configuration for serial data transfer between the chips.

As shown in FIG. 7, registers 710, 711, and 712 are provided within the printer image processing section 309, the image processing section 501, and the reader image processing section 308, respectively. The system controller 500 can perform read/write access to each of the registers 710 to 712 for setting/resetting various parameters, using the serial data signal line 510 and the synchronizing clock signal line 511.

Serial data transmitted via the master interface 2147 of the system controller 500 is sent over the serial data signal line 510 to a slave interface (1) 701 of the printer image processing section 309 in timing synchronous with a synchronizing clock signal flowing on the synchronizing clock signal line 511, and then received by the printer image processing section 309. Thereafter, the serial data is sent via a master interface (1) 702 of the printer image processing section 309 over the serial data signal line 510 to a slave interface (2) 703 of the image processing section 501 in timing synchronous with the synchronizing clock signal flowing on the synchronizing clock signal line 511.

Similarly, the serial data is received via the slave interface (2) 703 of the image processing section 501 and then sent via a master interface (2) 704 of the image processing section 501 over the serial data signal line 510 to a slave interface (3) 705 of the reader image processing section 308 in timing synchronous with the synchronizing clock signal flowing on the synchronizing clock signal line 511.

Similarly, the serial data is received via the slave interface (3) 705 of the reader image processing section 308 and then sent via a master interface (3) 706 of the reader image processing section 308 over the serial data signal line 510 to the slave interface 2148 of the system controller 500 in timing synchronous with the synchronizing clock signal flowing on the synchronizing clock signal line 511.

The master interface (1) 702 and the slave interface (1) 701 are connected to an internal bus 707 within the printer image processing section 309, and the received or transmitted serial data is transferred via the internal bus 707. Similarly, the master interface (2) 704 and the slave interface (2) 703 are connected to an internal bus 708 within the image processing section 501, and the master interface (3) 706 and the slave interface (3) 705 are connected to an internal bus 709 within the reader image processing section 308, whereby the received or transmitted serial data is transferred via the internal bus 708 and the internal bus 709.

The internal buses 707, 708, and 709 are provided for read/write access to the respective registers 710, 711, and 712, and the registers 710 to 712 are accessed via the internal buses 707 to 709, respectively.

When a command for writing in a register is sent from the CPU 2001 of the system controller 500 to the system bus bridge 2007 via the CPU bus 2126, and the address of the register intended for writing is associated with one of the printer image processing section 309, the image processing section 501, and the reader image processing section 308, the write command is sent from the system bus bridge 2007 to the master interface 2147.

Upon receipt of the write command, the master interface 2147 prepares a write command transaction based on the chip ID and address information of a slave chip associated with the write command, and prepares a write data transaction based on information on data to be written. The write command transaction and the write data transaction prepared by the master interface 2147 are sent as serial data from the master interface 2147 to the printer image processing section 309 via the serial data signal line 510 in timing synchronous with the synchronizing clock signal flowing on the synchronizing clock signal line 511.

The respective slave chips of the printer image processing section 309, the image processing section 501, and the reader image processing section 308, receive the write command transaction and the write data transaction. When the write address of the write command transaction is associated with the slave chip of the printer image processing section 309, the slave interface (1) 701 permits write access to a register in the printer image processing section 309 via the internal bus 707 for the data in the data transaction. When the write address of the write command transaction is associated with the slave chip of the image processing section 501, the slave interface (2) 703 permits write access to a register in the image processing section 501 via the internal bus 708 for the data in the data transaction, and when the write address of the write command transaction is associated with the slave chip of the reader image processing section 308, the slave interface (3) 705 permits write access to a register in the reader image processing section 308 via the internal bus 709 for the data in the data transaction.

At the same time, each of the master interface (1) 702, the master interface (2) 704, and the master interface (3) 706 of the respective slave chips of the printer image processing section 309, the image processing section 501, and the reader image processing section 308 transmits the serial data received via the associated one of the slave interface (1) 701, the slave interface (2) 703, and the slave interface (3) 705 onto the serial data signal line 510 in timing synchronous with the synchronizing clock signal flowing on the synchronizing clock signal line 511.

When receiving the serial data from the master interface (3) 706 of the reader image processing section 308, the slave interface 2148 checks whether or not the serial data has a parity error. If no parity error is detected, it is judged that the processing for the write transaction is completed.

On the other hand, if a parity error is detected in the serial data received by the slave interface 2148, it is judged that an error has occurred in the transaction, and an error code is issued to the CPU 2001 for error processing.

When a command for a read operation (hereinafter referred to as the read command) of a register within one of the printer image processing section 309, the image processing section 501, and the reader image processing section 308 is sent from the CPU 2001 of the system controller 500 to the system bus bridge 2007 via the CPU bus 2126 and the address of the register intended for reading is associated with one of the printer image processing section 309, the image processing section 501, and the reader image processing section 308, the read command is sent from the system bus bridge 2007 to the master interface 2147.

Upon receipt of the read command, the master interface 2147 prepares a read command transaction based on the chip ID and address information of a slave chip associated with the read command. The read command transaction prepared by the master interface 2147 is sent as serial data from the master interface 2147 to the printer image processing section 309 via the serial data signal line 510 in timing synchronous with the synchronizing clock signal flowing on the synchronizing clock signal line 511.

The slave chips of the printer image processing section 309, the image processing section 501, and the reader image processing section 308 receive the read command transaction. When the read address of the read command transaction is associated with the printer image processing section 309, the slave interface (1) 701 permits read access to the register in the printer image processing section 309 via the internal bus 707. When the read address of the read command transaction is associated with the image processing section 501, the slave interface (2) 703 permits read access to the register in the image processing section 501 via the internal bus 708, and when the read address of the read command transaction is associated with the reader image processing section 308, the slave interface (3) 705 permits read access to the register in the reader image processing section 308 via the internal bus 709.

At the same time, each of the master interface (1) 702, the master interface (2) 704, and the master interface (3) 706 of the respective slave chips of the printer image processing section 309, the image processing section 501, and the reader image processing section 308 transmits the serial data received via the associated one of the slave interface (1) 701, the slave interface (2) 703, and the slave interface (3) 705 onto the serial data signal line 510 in timing synchronous with the synchronizing clock signal flowing on the synchronizing clock signal line 511.

Upon receipt of the read command transaction, the master interface (1) 702, the master interface (2) 704, or the master interface (3) 706, i.e. the master interface of the slave chip associated with the read address receives the read data from an associated one of the internal buses 707, 708, and 709, and prepares a read data transaction, and then converts the read data transaction into serial data, followed by transmitting the serial data onto the serial data signal line 510 in timing synchronous with the synchronizing clock signal flowing on the synchronizing clock signal line 511.

The slave interface 2148 receives the read command transaction of the serial data transmitted from the master interface (3) 706 of the reader image processing section 308, and then receives the read data transaction.

Upon receipt of the read data transaction, the slave interface 2148 acquires information on the read data of the necessary register from the received read data transaction, and delivers the read data of the register to the CPU 2001 of the system controller 500 via the system bus bridge 2007 and the CPU bus 2126.

The slave interface 2148 checks whether or not the read command transaction and the read data transaction have a parity error. If no parity error is detected, it is judged that the processing for the read transaction is completed.

On the other hand, if a parity error is detected in the serial data received by the slave interface 2148, it is judged that an error has occurred in the transaction, and an error code is issued to the CPU 2001 for error processing.

As described above, according to the present embodiment, a master chip and a plurality of slave chips which receive data transferred from the master chip are connected in a ring, for transmission and reception of serial data between the chips. As a result, the single master chip can send serial data to the slave chips in one transaction.

Each of the slave chips receives the serial data and analyzes the received serial data to carry out internal processing, i.e. writing in or reading from a register provided in the slave chip, or transfer the serial data to the next slave chip until the serial data is finally transferred to the master chip. As a result, serial data in units of several bits can be transferred from the single master chip to the slave chips in only one transaction.

Further, each of the master chip and the slave chips is required to have only two ports, i.e. a port for serial data and a synchronizing clock signal port for serial data transfer, as interface ports. As a result, it is possible to reduce the number of ports in each chip.

Furthermore, even when the number of the slave chips is increased, the number of the ports in each of the chips is not changed, and the chips are connected in a ring by signal lines (the serial data signal line 510 and the synchronizing clock signal line 511). As a result, it is possible to prevent an increase in the number of signal lines.

Next, a description will be given of a second embodiment of the present invention with reference to FIGS. 8 to 10.

In the present embodiment, similarly to the first embodiment, to solve the problems with the prior art, two or more slave chips are connected in a ring to a single master chip by two signal lines, i.e. a serial data signal line and a transfer synchronizing clock line such that register data to be transferred can be sent as serial data along the serial data signal line and transferred from one slave chip to another, to finally return to the master chip.

Similarly to the serial data transferred on the serial data line, the synchronizing clock signal flowing on the transfer synchronizing clock line can be transferred from one slave chip to another, to finally return to the master chip.

The master chip and the slave chips receive and transmit the serial data on the serial data signal line in timing synchronous with the synchronizing clock signal on the transfer synchronizing clock line.

The serial data is transferred from the master chip to the slave chips, whereby the master chip controls each of the slave chips to read from or write in a resister of the slave chip.

To write in a register, the master chip issues a write transaction, whereby data is written only in a register of a predetermined slave chip.

Similarly, to read from a register, the master chip issues a read transaction, whereby only data in a register of a predetermined slave chip is read.

A latch for storing a transfer state of serial data is provided in each of the slave chips so that when an error occurs in serial data being transferred, the master chip (CPU thereof) can grasp an error condition of the slave chip, and the slave chip constantly monitors the state of serial data transferred thereto so as to store the error condition in the latch when an error occurs due to noise.

The transfer state of serial data is determined based on a first flip-flop (hereinafter referred to as FF) that synchronizes serial data with the synchronizing clock signal and a second FF that synchronizes serial data with a clock signal obtained by inverting the synchronizing clock signal, both FFs being provided in the first serial data-receiving stage of each slave chip. More specifically, the transfer state of serial data is determined based on a state of the serial data synchronized by the first FF with the leading edge of each clock pulse of the synchronizing clock signal and a state of the serial data synchronized by the second FF with the leading edge of each clock pulse of the clock signal obtained by inverting the synchronizing clock signal.

A XOR (exclusive OR) of the serial data synchronized by the first FF with the synchronizing clock signal and the serial data synchronized by the second FF with the clock signal obtained by inverting the synchronizing clock signal is determined, and the output information of the XOR is stored as an error condition by the latch.

The error condition differs between the case where serial data is not affected by noise and the case where the influence of noise is reflected on serial data, causing a shot noise not longer in duration than a half clock period.

In short, it is possible to use the error condition to discriminate between the case where an error has occurred in serial data due to the influence of noise and the case where serial data is normal.

When the master chip (CPU thereof) needs to determine the error condition of a slave chip, the associated latch storing the error condition is accessed. The slave chip whose latch is accessed converts information on the error condition (hereinafter referred to as "error information") into serial data and then transfers the serial data to the master chip or another slave chip. That is, error information is read by the same flow control method as employed in the control of reading from a register or a method of outputting error information from the slave chip that executes reading of the error information, using a signal line for connection to the other slave chips than the slave chip that executes the reading.

The master chip (CPU thereof) reads the error information from a predetermined slave chip and then determines whether or not the transfer state was in an error condition. If the transfer state was in an error condition, the master chip determines that serial data could not be normally transferred to the predetermined slave chip, and transfers the serial data again to the predetermined slave chip or optimizes the frequency of the synchronizing clock signal to be transferred, by lowering the frequency of the synchronizing clock signal to be transferred, for reduction of the influence of noise generated during transfer of serial data, so as to prevent an error from occurring in the serial data during transfer due to the influence of noise.

In the following, a description will be given of a transfer format of serial data, transactions, an operation in each of the transactions, and processing in response to occurrence of an error in the serial data during transfer, in the present embodiment.

The master chip handles all serial data transferred to the slave chips in units of unitary transactions each formed by several bits, and determines on a unitary transaction-by-unitary transaction basis whether or not each serial data is valid.

In transfer of serial data in units of unitary transactions, to determine the start point of each valid unitary transaction, the master chip always places only the leading one bit thereof in a H (High) state, and always places the first bit of each invalid unitary transaction in a L (Low) state. This enables the start point of each valid unitary transaction to be determined, and when serial data has been transferred by the number of bits to be handled as one unit of a unitary transaction, it is determined that transfer of the transaction is completed.

Serial data is divided into command data for discriminating the type of transfer and data to be transferred, and the former is handled as a transaction of command data (hereinafter referred to as the command transaction or the command part), and the latter as a transaction of data (hereinafter referred to as the data transaction or the data part).

Further, to identify each of the slave chips, the master chip issues a configuration transaction to the slave chips to thereby assign a unique number to each of the slave chips and uses this number as a chip ID (identifier) for identifying the associated slave chip.

The command part includes an identifier for discrimination between the data part and the command part (hereinafter referred to as the C/D identifier), an identifier for discrimination between a write transaction and a read transaction (hereinafter referred to as the W/R identifier), an identifier for identifying the transfer width of data (hereinafter referred to as the bit mode), the identifier as the chip ID for identifying a slave chip (hereinafter referred to as the chip ID), and information on a read or write address.

The data part includes the C/D identifier, the W/R identifier, Bit Mode, the chip ID and information on data to be read or written.

To issue transactions to the slave chips, after the system is reset, first, the master chip issues the configuration transaction to the slave chips to assign respective chip IDs thereto.

The configuration transaction has only the command part, and the command part includes the C/D identifier which is activated (it is assumed that the C/D identifier is, for example, activated when the transaction is the command part, and deactivated when the same is the data part), a type identifier (it is assumed that, for example, the type identifier is set to 00 when the transaction is a configuration transaction), and the chip ID (it is assumed that the chip ID is, for example, set to 0 when the transaction is issued from the master chip).

The master chip does not issue the next transaction until the configuration transaction issued by the master chip returns to the master chip via the slave chips and the master chip completes the reception thereof.

Upon reception of the configuration transaction, each slave chip adds 1 to the value of the chip ID in the configuration transaction and then stores the value in a chip ID data register provided in the slave chip.

Then, each slave chip puts the value stored in the chip ID data register thereof into the configuration transaction to be forwarded to the next slave chip or the master chip, and delivers the resulting configuration transaction.

The configuration transaction is passed from one slave chip to another, to finally return to the master chip. The master chip determines, based on the value of the chip ID in the received configuration transaction, how many slave chips are connected in a ring. When the value of the chip ID is equal to N, it means that N slave chips are connected in a ring.

To write data in a predetermined register of a specific one of the slave chips, the master chip issues a command part to the slave chip, and then issues a data part in succession thereto.

In this case, the command part includes the C/D identifier which is activated, the W/R identifier which is activated, the bit mode which is set to predetermined data width information, the chip ID which is set to a predetermined value (configuration value of the intended slave chip), and information on the set address value of the predetermined register.

The data part includes the C/D identifier which is deactivated, the W/R identifier which is activated, the bit mode which is set to the predetermined data width information, the chip ID, and information on the set value of the data to be written in the predetermined register.

In this case, even before the write transaction issued by the master chip returns to the master chip via the slave chips, the master chip issues write transactions successively.

Therefore, insofar as a write transaction is concerned, the master chip cannot check from the write transaction whether or not data was written in any one of the slave chips. The master chip having received a transaction sent from the slave chips through the ring-like signal line only determines whether or not there was any parity error in the received transaction (any one of the unitary transactions thereof).

On the other hand, each of the slave chips receives the transactions transferred from the master chip or the immediately preceding slave chip, and reads the identifiers and the information on data configuration from the transactions to determine whether or not each of the received transactions should be processed. If the received transaction should be processed, the data is written in the register of the slave chip. Transactions which are not to be processed by the slave chip are sequentially passed to the next slave chip or the master chip.

This enables the master chip to write data in the register of a slave chip into which data is desired to be written.

To read data in a register of a specific one of the slave chips, the master chip issues only a command part to the specific slave chip.

In this case, the command part includes the C/D identifier which is activated, the W/R identifier which is deactivated, the bit mode which is set to predetermined data width information, the chip ID which is set to a predetermined value (configuration value of the intended slave value), and further information on the set address value of the predetermined register.

In this case, before the read command part issued by the master chip returns to the master chip via the slave chips, and the master chip completes reception of a read data part issued by the slave chip which has carried out processing of the read command part, the master chip does not issue the next transaction.

With regard to a read transaction operation, while a read command part transferred from the master chip is received by each slave chip and transferred from the slave chip to the next slave chip or the master chip, a read data part is issued by one of the slave chips which has carried out processing of the read command part.

After having received the read command part, the master chip receives the read data part. The master chip is held in a wait state for receiving the read data part until completion of reception thereof. After completing the reception of the read data part, the master chip starts a transfer operation for the next transaction.

Each slave chip receives each transaction transferred from the master chip or the immediately preceding slave chip, and reads the identifiers and the information on data configuration from the transaction to determine whether or not the received transaction should be processed. According to the transaction which should be processed, the slave chip reads data from its register.

The slave chip having processed the read command part transfers the read data part based on the data read from the register. At this time, the slave chip having processed the read command part adds the identifiers and information on data configuration required for issuing the read data part to the data read from the register, to thereby issue the read data part.

When a read command part transferred to a slave chip is not one to be processed by the slave chip, the slave chip passes the read command part to the next slave chip without processing the same.

After the master chip transmits a read transaction to the slave chips, it receives the read command part having being transferred through the slave chips, and then receives a read data part. Therefore, when receiving the read command part, the master chip can determine, based on the chip ID, a slave chip that has performed data reading, and determine, based on address information, the address of the register from which data has been read. When receiving the read data part, the master chip can determine the data values of the register from which the data have been read, based on information on the data parts.

This enables the master chip to read data from the register of a slave chip from which data is desired to be read.

When a slave chip detects an error in the latch storing the error state, the slave chip recognizes that improper data exists in the transaction, and immediately transfers the transaction to the next slave chip or the master chip without writing or reading the data of the transaction in or from its register or the like.

The master chip (CPU thereof) determines the transfer state of each of the slave chips by accessing an associated latch storing the error state, periodically or when needed.

When the transfer state is in an error condition, the master chip (CPU thereof) gains access again to the register where the error has occurred. When the error has been detected in a write transaction, the same data is written again in the same register where the error has occurred, whereas when the error has been detected in a read transaction, data is read again from the same register where the error has occurred.

In the alternative method of handling an error in serial data transfer, when the transfer state is in an error condition, the master chip (CPU thereof) lowers the frequency of the synchronizing clock signal used in the serial data transfer, to thereby reduce the influence of noise generated in the serial data transfer. When the frequency of the synchronizing clock signal for transfer is lowered, an error becomes hard to be caused by noise.

The master chip lowers the frequency of the synchronizing clock signal while considering the transfer rate of serial data, and then accesses the latch storing the current error state of each slave chip. When the transfer state is still in an error condition, the master chip further lowers the frequency of the synchronizing clock signal.

The above-described processing is repeatedly carried out, whereby the optimal frequency of the synchronizing clock signal is determined at which the influence of noise is eliminated.

In the following, the present embodiment will be described in detail with reference to FIGS. 8A to 10.

The arrangement of a data processing system including a data transfer device according to the present embodiment is the same as that of the data processing system of the first embodiment shown in FIGS. 1 to 7, and therefore the following description will be given also with reference to FIGS. 1 to 7 as required.

Figure 8A:
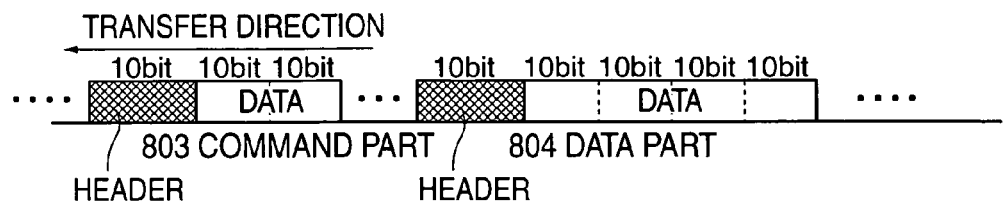
FIG. 8 is a diagram useful in explaining the data structure of a transaction as serial data handled by a data transfer device according to a second embodiment of the present invention and a data transfer device according to a third embodiment of the present invention.
Figure 8B:
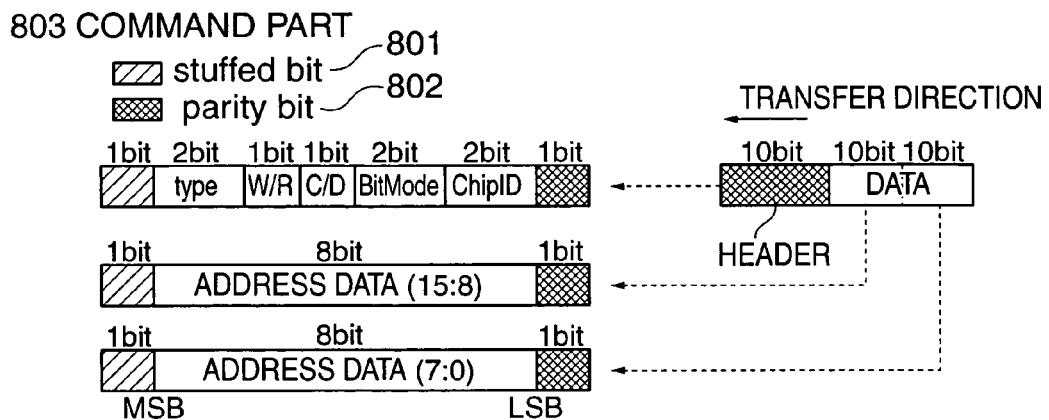
Figure 8C:
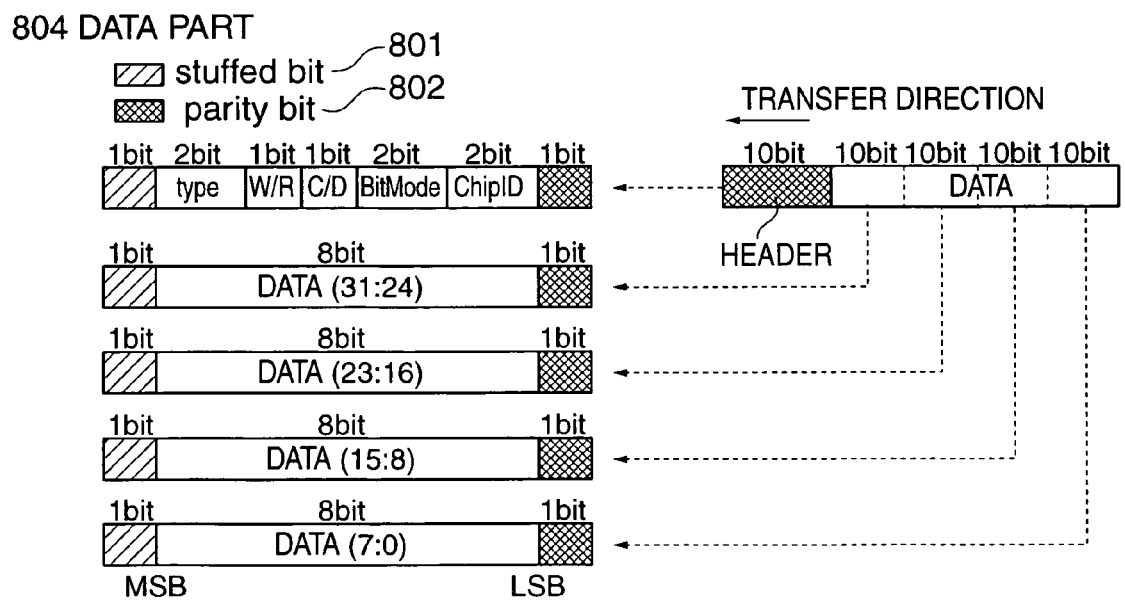

FIGS. 8A to 8C are diagrams showing an example of data format of serial data used for transactions processed by the data transfer device according to the present embodiment. In FIGS. 8A to 8C, reference numeral 801 designates a stuffed bit, 802 a parity bit, 803 the command part, and 804 the data part.

Figure 9:
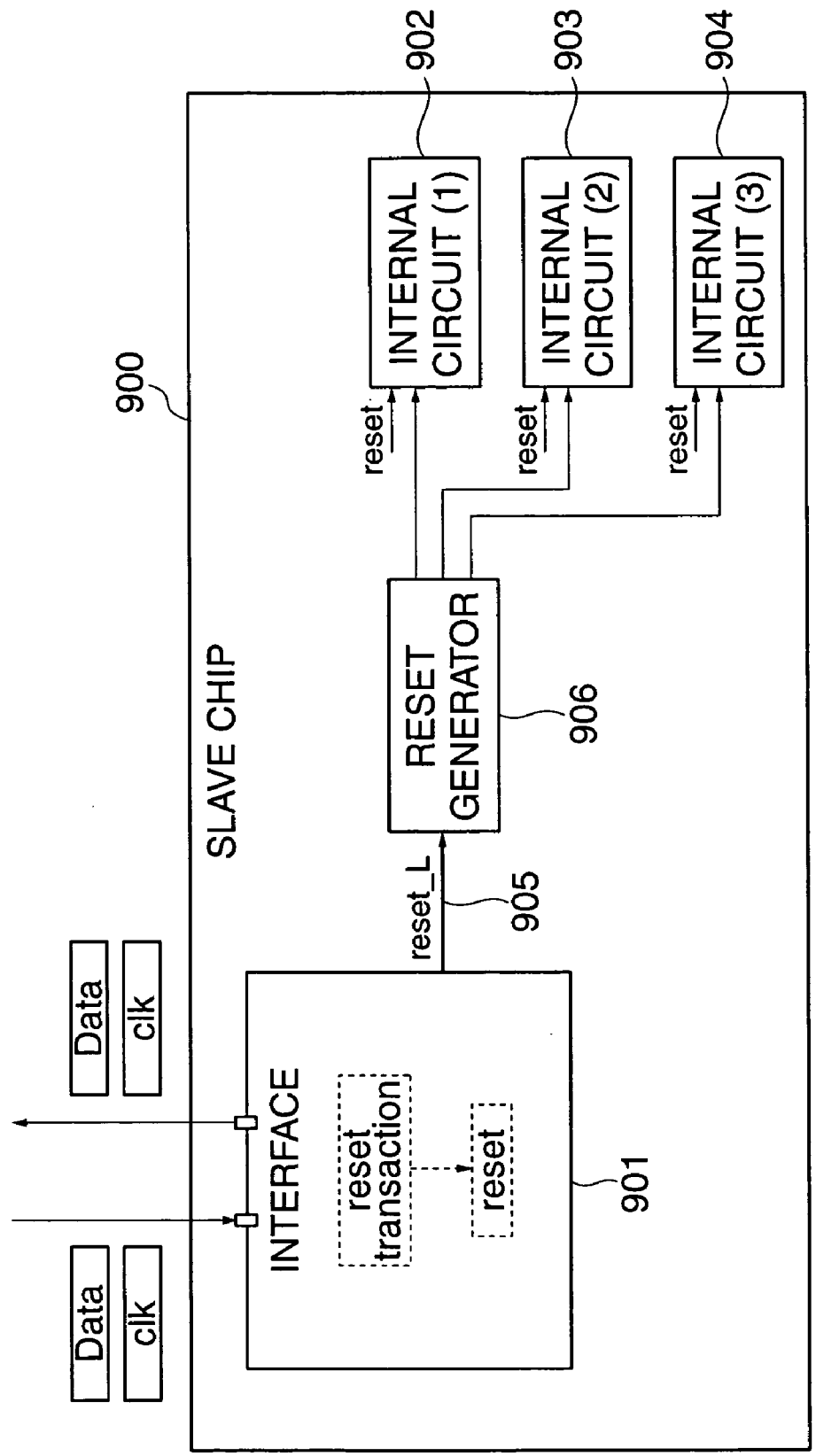
FIG. 9 is a diagram useful in explaining a reset operation by the data transfer devices according to the second and third embodiments.

FIG. 9 is a diagram useful in explaining a reset operation of the data transfer device according to the present embodiment. In FIG. 9, reference numeral 900 designates a slave chip, 901 an interface, 902 an internal circuit (1), 903 an internal circuit (2), 904 an internal circuit (3), 905 a reset signal, and 906 a reset generator.

Figure 10:
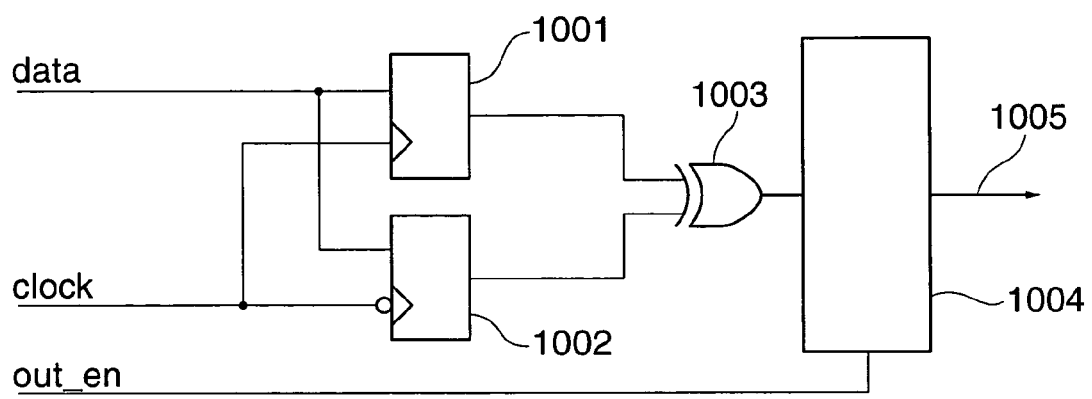
FIG. 10 is a diagram useful in explaining the reset operation by the data transfer device data transfer devices according to the second and third embodiments.

FIG. 10 is also a diagram useful in explaining a reset operation of the data transfer device according to the present embodiment. In FIG. 10, reference numerals 1001 and 1002 designate FFs, 1003 a XOR gate, 1004 a latch, and 1005 an output data line.

The master chip handles all serial data transferred to the slave chips in units of unitary transactions each formed by several bits, and it is determined on a unitary transaction-by-unitary transaction basis whether or not each serial data is valid.

In transfer of serial data to the slave chips in units of unitary transactions, to determine the start point of each valid unitary transaction, the master chip always places only the stuffed bit 801 (see FIGS. 8B and 8C) which is the leading one bit of the valid unitary transaction in a H (High) state, but always places the leading one bit of each invalid unitary transaction in a L (Low) state. This enables the start point of each valid unitary transaction to be determined, and when serial data has been transferred by the number of bits to be handled as one unit of a unitary transaction, it is determined that transfer of the transaction is completed.

The master chip adds the parity bit 802 (see FIG. 8B) to each unitary transaction to thereby detect an error in the transaction.

As shown in FIG. 8A, transactions are classified into the command parts 803 and the data parts 804, and each command part 803 and the data part 804 associated with the command part 803 are transferred in the mentioned order.

The header of each of the command part 803 and the data part 804 contains the identifiers for designating the operation of the transaction. The command part 803 contains address data information in succession to the header (see FIG. 8B), while the data part 804 contains register data information in succession to the header (see FIG. 8C).

As shown in FIG. 6, a configuration operation command for a register is sent from the CPU 2001 of the system controller 500 to the system bus bridge 2007 via the CPU bus 2126, and then sent from the system bus bridge 2007 to the master interface 2147.

The configuration operation command is a command set for determining how many controllable slave chips are connected to the master chip in a ring. The configuration operation command includes a command for causing the master interface 2147 to issue a configuration transaction, and a command for reading the value of the chip ID when the issued configuration transaction returns to the master interface 2147.

The value of the chip ID corresponds to the number of slave chips connected to the master chip in a ring.

In response to the configuration operation command received from the CPU 2001, the master interface 2147 sets the value of the chip ID to 0, and prepares a configuration transaction. The configuration transaction prepared by the master interface 2147 is sent as serial data from the master interface 2147 to the printer image processing section 309 in timing synchronous with the synchronizing clock signal flowing on the synchronizing clock signal line 511 (see FIG. 7).

When receiving the configuration transaction, the slave interface (1) 701 of the printer image processing section 309 increments the value of the received chip ID by 1 and stores the chip ID as its own chip ID. The chip ID whose value has been incremented by 1 is transmitted as the updated configuration transaction, i.e. as the serial data signal, from the slave interface (1) 701 to the slave interface (2) 702 of the image processing section 501 in timing synchronous with the synchronizing clock signal.

The configuration transaction thus updated is similarly processed by each of the slave chips of the image processing section 501 and the reader image processing section 308, and finally sent to the slave interface 2148 of the system controller 500.

After having received the configuration transaction, the slave interface 2148 acquires chip ID information therefrom and sends the chip ID data to the CPU 2001 of the system controller 500 via the system bridge bus 2007 and the CPU bus 2126.

The numerical values of the chip IDs thus sequentially updated represent respective numbers (IDs) assigned to the slave chips, with the final numerical value acquired from the returned configuration transaction being equal to the number of the slave chips.

In the present example, the chip ID of the printer image processing section 309 is 1, that of the image processing section 501 is 2, and that of the reader image processing section 308 is 3. The CPU 2001 recognizes that three slave chips are connected to the master chips.

Assuming that a write operation command for a register is sent from the CPU 2001 of the system controller 500 to the system bus bridge 2007 via the CPU bus 2126, and the address of the register into which data is to be written is associated with one of the printer image processing section 309, the image processing section 501, and the reader image processing section 308, the write operation command is sent from the system bus bridge 2007 to the master interface 2147.

The write operation command includes chip ID information, address information, and write data information, which are required for the CPU 2001 to execute writing of data in a register of a controllable slave chip.

Upon receipt of the write operation command, the master interface 2147 prepares a write command part based on the chip ID and address information of a slave chip for which the command is intended. The write command part prepared by the master interface 2147 is sent as serial data from the master interface 2147 to the printer image processing section 309 in timing synchronous with the synchronizing clock signal flowing on the synchronizing clock signal line 511.

Then, after having issued the write command part, the master interface 2147 prepares a write data part based on the write data information. The write data part prepared by the master interface 2147 is sent as serial data via the master interface 2147 to the printer image processing section 309 in timing synchronous with the synchronizing clock signal flowing on the synchronizing clock signal line 511.

The slave interface (1) 701 of the printer image processing section 309 receives the write command part, and if the write address of the received write command part is for the slave chip of its own, the slave interface (1) 701 writes write data contained in the write data part onto the internal bus 707. At the same time, the slave interface (1) 701 passes the serial data sent thereto in parallel with the received write command part via the master interface 2147 to the image processing section 501 positioned next in timing synchronous with the synchronizing clock signal flowing on the synchronizing clock signal line 511.

At this time, if a parity error is detected in the received serial data, it is judged that an error has occurred in the transaction, and the slave interface (1) 701 does not perform the writing of the write data onto the internal bus 707.

The data writing operation is similarly performed by each of the respective slave chips of the image processing section 501 and the reader image processing section 308.

When receiving the serial data from the master interface (3) 706 of the reader image processing section 308, the slave interface 2148 checks whether or not the serial data has a parity error. If no parity error is detected, it is judged that processing for the write transaction (the write data part) is completed.

On the other hand, if a parity error is detected in the serial data received by the slave interface 2148, it is judged that an error has occurred in the write transaction, and an error code is issued to the CPU 2001 for error processing.

When a read operation command for a register is sent from the CPU 2001 of the system controller 500 to the system bus bridge 2007 via the CPU bus 2126, and the address of the register from which data is to be read is associated with one of the printer image processing section 309, the image processing section 501, and the reader image processing section 308, the read operation command is sent from the system bus bridge 2007 to the master interface 2147.

Upon receipt of the read operation command, the master interface 2147 prepares a read command part based on the chip ID and address information of a slave chip for which the command is intended. The read command part prepared by the master interface 2147 is sent as serial data from the master interface 2147 to the printer image processing section 309 in timing synchronous with the synchronizing clock signal flowing on the synchronizing clock signal line 511.

The read operation command includes chip ID and address information, which are required for the CPU 2001 to execute reading of data from a register of a controllable slave chip.

The printer image processing section 309, the image processing section 501, and the reader image processing section 308 receive the read command part. When the read address of the read command part is associated with the printer image processing section 309, the slave interface (1) 701 permits read access to the internal bus 707. When the read address is associated with the image processing section 501, the slave interface (2) 703 permits read access to the internal bus 708, while when the read address is associated with the reader image processing section 308., the slave interface (3) 705 permits read access to the internal bus 709.

At the same time, the master interface (1) 702 of the printer image processing section 309, the master interface (2) 704 of the image processing section 501, or the master interface (3) 706 of the reader image processing section 308 transmits the serial data received by the associated one of the slave interface (1) 701, the slave interface (2) 703, and the slave interface (3) 705 onto the serial data signal line 510 in timing synchronous with the synchronizing clock signal flowing on the synchronizing clock signal line 511.

Upon receipt of the read command part, the master interface (1) 702, the master interface (2) 704, or the master interface (3) 706, i.e. the master interface of the slave chip associated with the read address receives the read data from the associated one of the internal buses 707, 708, and 709, and prepares a read data part. Then, after converting the read data part into serial data, the master interface transmits the serial data onto the serial data signal line 510 in timing synchronous with the synchronizing clock signal flowing on the synchronizing clock signal line 511.

The slave interface 2148 receives the read command part of the serial data transmitted from the master interface (3) 706 of the reader image processing section 308, and then receives the read data part.

Upon receipt of the read data part, the slave interface 2148 acquires information on read data necessary for reading the same from the associated register, from the received read data part, and sends the read data for the register to the CPU 2001 of the system controller 500 via the system bus bridge 2007 and the CPU bus 2126.

The slave interface 2148 checks whether or not there is a parity error in the read command part and the read data part. If no parity error is detected, it is judged that the transaction of reading data is completed.

On the other hand, if a parity error is detected in the serial data received by the slave interface 2148, it is judged that an error has occurred in the transaction, and an error code is issued to the CPU 2001 for error processing.

When a write operation command or a read operation command for a register is sent from the CPU 2001 of the system controller 500 to one of the slave chips, a predetermined transaction is transferred from the master interface 2147 to the slave chip associated with the operation command.

Serial data transferred to each slave chip is sent to the interface 901 appearing in FIG. 9. The interface 901 in FIG. 9 corresponds to the pair of the slave interface (1) 701 and the master interface (1) 702. The slave chip 900 corresponds to the printer image processing section 309, the image processing section 501, or the reader image processing section 308.

The internal circuit (1) 902, the internal circuit (2) 903, and the internal circuit (3) 904 in FIG. 9 are provided inside the slave chip 900. The master interface 2147 accesses the internal circuits 902 to 904 via the interface 901 by serial data transfer.

The slave chip 900 synchronizes the transferred serial data with the synchronizing clock signal at the first stage FF 1001 in FIG. 10, and with the clock signal obtained by inverting the synchronizing clock signal at the FF 1002 at the same time. Output data from the FF 1001 and the FF 1002 are XORed by the XOR gate 1003, and the XORed data is stored in the latch 1004.

When receiving a reset operation command from the CPU 2001, the master interface 2147 prepares a reset transaction using the chip ID of a slave chip for which this command is intended. The reset transaction prepared by the master interface 2147 is sent as serial data from the master interface 2147 to the printer image processing section 309 in timing synchronous with the synchronizing clock signal flowing on the synchronizing clock signal line 511.

The reset command is a command set issued to the master interface 2147, for resetting controllable slave chips individually or all at a time. The reset command includes a command for causing the master interface 2147 to issue the reset transaction, and a chip ID value of a slave chip desired to be reset.

The chip ID value is set to 1 when it is desired to reset the printer image processing section 309, to 2 when it is desired to reset the image processing section 501, and to 3 when it is desired to reset the reader image processing section 308. When it is desired to reset all the slave chips, the chip ID value is set to 0.

Referring to FIG. 7, the slave interface (1) 701 of the printer image processing section 309 receives a reset transaction, and if the chip ID value contained in the received reset transaction is 0 or equal to the chip ID value stored during the configuration transaction, reset processing is executed. In this case, before the reset processing is started, the reset transaction is sent as serial data from the master interface (1) 702 to the slave interface (2) 703 of the image processing section 501 in timing synchronous with the synchronizing clock signal. The reset processing is executed after completion of transmission of the reset transaction from the master interface (1). 702.

The reset processing is performed on the internal circuit of the printer image processing section 309 as well as on the slave interface (1) 701 and the master interface (1) 702. The reset of the slave interface (1) 701 and the master interface (1) 702 is executed after completion of transmission of the reset transaction from the master interface (1) 702. The reset of the internal circuit of the printer image processing section 309 is performed by outputting a reset signal to the internal circuit from the slave interface (1) 701 or the master interface (1) 702.

The interface 901 in FIG. 9 corresponds to the pair of the internal circuit from the slave interface (1) 701 and the master interface (1) 702, as mentioned above. The aforementioned internal circuit corresponds to the internal circuit (1) 902, the internal circuit (2) 903, and the internal circuit (3) 904. During the reset operation, the interface 901 activates the reset signal 905 for the internal circuits 902 to 904. If the active time interval of the reset signal 905 is required to be not shorter than a predetermined time period, the active time interval is increased by an amount corresponding to the required time period, whereby the internal circuit (1) 902, the internal circuit (2) 903, and the internal circuit (3) 904 are reset. Simultaneously, the interface 901 itself enters a reset state.

The reset transaction similarly passes through the image processing section 501 and the reader image processing section 308, and is finally sent to the slave interface 2148 of the system controller 500.

This enables the CPU 2001 to carry out a reset operation only on a desired slave chip, without adversely affecting the other slave chips by the reset operation.

As described above in detail hereinabove, according to the present embodiment, a master chip and a plurality of slave chips which receive data transferred from the master chip are connected in a ring, for transmission and reception of serial data between the chips. As a result, the single master chip can send the serial data to the slave chips in one transaction.

Further, each of the master chip and the slave chips is required to have only two ports, i.e. a port for serial data and a synchronizing clock signal port for serial data transfer, as interface ports. As a result, it is possible to reduce the number of ports in each chip.

Furthermore, even when the number of the slave chips is increased, the number of the ports in each of the chips is not changed, and the chips are connected in a ring by signal lines (the serial data signal line and the synchronizing clock signal line). As a result, it is possible to prevent an increase in the number of signal lines.

Moreover, when it is desired to reset or initialize a predetermined slave chip alone, it is possible to easily reset only the predetermined slave chip through communication with the slave chip from the master chip, without resetting the other chips and the system itself.

Next, a description will be given of a third embodiment of the present invention.

In the present embodiment as well, to solve the problems with the prior art, two or more slave chips are connected in a ring to a single master chip by two signal lines, i.e. a serial data signal line and a transfer synchronizing clock line such that register data to be transferred can be sent as serial data along the serial data signal line and transferred from one slave chip to another, to finally return to the master chip.

Similarly to the serial data transferred on the serial data line, the synchronizing clock signal flowing on the transfer synchronizing clock line can be transferred from one slave chip to another, to finally return to the master chip.

The master chip and the slave chips receive and transmit the serial data on the serial data signal line in timing synchronous with the synchronizing clock signal on the transfer synchronizing clock line.

The serial data is transferred from the master chip to the slave chips, whereby the master chip controls each of the slave chips to read from or write in a resister of the slave chip.

To reset each of the slave chips from the master chip, the master chip issues a reset transaction. The issued reset transaction is sent as serial data from the master chip sequentially through the slave chips connected in a ring to the master chip. Upon receipt of the serial data, each slave chip resets the internal components thereof only when the slave chip is intended to be reset. Otherwise, the slave chip passes the serial data to the next slave chip or the master chip. Thus, only the intended slave chip is reset.

To write in a register, the master chip issues a write transaction, whereby data is written only in a register of a predetermined slave chip.

Similarly, to read from a register, the master chip issues a read transaction, whereby only data in a register of a predetermined slave chip is read.

The master chip handles all serial data transferred to the slave chips in units of unitary transactions each formed by several bits, and determines on a unitary transaction-by-unitary transaction basis whether or not each serial data is valid.

In transfer of serial data in units of transactions, to determine the start point of each valid unitary transaction, the master chip always places only the leading one bit thereof in a H (High) state, but always places the first bit of each invalid unitary transaction in a L (Low) state. This enables the start point of each valid unitary transaction to be determined, and when serial data has been transferred by the number of bits to be handled as one unit of a unitary transaction, it is determined that transfer of the transaction is completed.

When a bit error occurs in a unitary transaction during transfer of serial data in units of unitary transactions between the master chip and the slave chips, and the unitary transaction comes to contain improper data information, error control is executed in each of the slave chips so as to prevent the improper data information from being written in a register or the like of the slave chip.

In the error control, the master chip adds a parity bit to data in each unitary transaction, and then transfers the data to the slave chips. Upon reception of each unitary transaction data, the slave chips perform a parity check on the parity bit to determine whether or not the parity bit added to the data by the master chip matches the parity bit of the received data, thereby detecting an erroneous transaction.

In the error control, parity checking is performed not only by each of the slave chips, but also by the master chip on the serial data returned from the slave chips through transfer along the ring-like signal line on a unitary transaction-by-unitary transaction basis.

In the error control, when a slave chip detects an erroneous transaction, the slave chip recognizes that improper data information exists in the transaction, and immediately transfers the transaction data to the next slave chip or the master chip without writing or reading the transaction data in its register or the like.

In the error control, when the master chip detects an erroneous transaction, the master chip recognizes that improper data information exists in the transaction, and displays an error message concerning the transaction data to provide an external notification that transfer of the transaction has failed.

Serial data is divided into command data for discriminating the type of transfer and data to be transferred, and the former is handled as a transaction of command data (hereinafter referred to as the command transaction or the command part), and the latter as a transaction of data (hereinafter referred to as the data transaction or the data part).

Further, to identify each of the slave chips, the master chip issues a configuration transaction to the slave chips to thereby assign a unique number to each of the slave chips and uses this number as a chip ID (identifier) for identifying the associated slave chip.

The command part includes an identifier for discrimination between the data part and the command part (hereinafter referred to as the C/D identifier), an identifier for discrimination between a write transaction and a read transaction (hereinafter referred to as the W/R identifier), an identifier for identifying the transfer width of data (hereinafter referred to as the bit mode), the identifier as the chip ID for identifying a slave chip (hereinafter referred to as the chip ID), and information on a read or write address.

The data part includes the C/D identifier, the W/R identifier, Bit Mode, the chip ID and information on data to be read or written.

To issue transactions to the slave chips, after the system is reset, first, the master chip issues the configuration transaction to the slave chips to assign respective chip IDs thereto.

When the reset transaction is issued as well, after the system is reset, first, the master chip issues the configuration transaction to the slave chips to assign respective chip IDs to the slave chips again, followed by starting each transaction.

The configuration transaction has only the command part, and the command part includes the C/D identifier which is activated (it is assumed that the C/D identifier is, for example, activated when the transaction is the command part, and deactivated when the same is the data part), a type identifier (it is assumed that, for example, the type identifier is set to 00 when the transaction is a configuration transaction), and the chip ID (it is assumed that the chip ID is, for example, set to 0 when the transaction is issued from the master chip).

The master chip does not issue the next transaction until the configuration transaction issued by the master chip returns to the master chip via the slave chips and the master chip completes the reception thereof.

Upon reception of the configuration transaction, each slave chip adds 1 to the value of the chip ID in the configuration transaction and then stores the value in a chip ID data register provided in the slave chip.

Then, each slave chip puts the value stored in the chip ID data register thereof into the configuration transaction to be forwarded to the next slave chip or the master chip, and delivers the resulting configuration transaction.

The configuration transaction is passed from one slave chip to another, to finally return to the master chip. The master chip determines, based on the value of the chip ID in the received configuration transaction, how many slave chips are connected in a ring. When the value of the chip ID is equal to N, it means that N slave chips are connected in a ring.

To write data in a predetermined register of a specific one of the slave chips, the master chip issues a command part to the slave chip, and then a data part in succession thereto.

In this case, the command part includes the C/D identifier which is activated, the W/R identifier which is activated, the bit mode which is set to predetermined data width information, the chip ID which is set to a predetermined value (configuration value of the intended slave chip), and information on the set address value of the predetermined register.

The data part includes the C/D identifier which is deactivated, the W/R identifier which is activated, the bit mode which is set to the predetermined data width information, the chip ID, and information on the set value of the data to be written in the predetermined register.

In this case, even before the write transaction issued by the master chip returns to the master chip via the slave chips, the master chip issues write transactions successively.

Therefore, insofar as a write transaction is concerned, the master chip does not check from the write transaction whether or not data has been written in any one of the slave chips. The master chip having received a transaction sent from the slave chips through the ring-like signal line only determines whether or not there was any parity error in the received transaction (any one of the unitary transactions thereof).

On the other hand, each of the slave chips receives the transactions transferred from the master chip or the immediately preceding slave chip, and reads the identifiers and the information on data configuration from the transactions to determine whether or not the received transaction should be processed. If the received transaction should be processed, the data is written in the register of the slave chip. Transactions which are not to be processed by the slave chip are sequentially passed to the next slave chip or to the master chip.

This enables the master chip to write data in the register of a slave chip into which data is desired to be written.

To read data from the register of a specific one of the slave chips, the master chip issues only a command part to the specific slave chip.

In this case, the command part includes the C/D identifier which is activated, the W/R identifier which is deactivated, the bit mode which is set to predetermined data width information, the chip ID which is set to a predetermined value (configuration value of the intended slave value), and further information on the set address value of the predetermined register.

In this case, before the read command part issued by the master chip returns to the master chip via the slave chips, and the master chip completes reception of a read data part issued by the slave chip which has carried out processing of the read command part, the master chip does not issue the next transaction.

With regard to a read transaction operation, while a read command part transferred from the master chip is received by each slave chip and transferred from the slave chip to the next slave chip or the master chip, a read data part is issued by one of the slave chips which has carried out processing of the read command part.

After having received the read command part, the master chip receives the read data part. The master chip is held in a wait state for receiving the read data part until completion of reception thereof. After completing the reception of the read data part, the master chip starts a transfer operation for the next transaction.

Each slave chip receives each transaction transferred from the master chip or the immediately preceding slave chip, and reads the identifiers and the information on data configuration from the transaction to determine whether or not the received transaction should be processed. According to the transaction which should be processed, the slave chip reads data from its register.

The slave chip having processed the read command part transfers the read data part based on the data read from the register. At this time, the slave chip having processed the read command part adds the identifiers and information on data configuration required for issuing the read data part to the data read from the register, to thereby issue the read data part.

When a read command part transferred to a slave chip is not one to be processed by the slave chip, the slave chip passes the read command part to the next slave chip without processing the same.

After the master chip transmits a read transaction to the slave chips, it receives the read command part having being transferred through the slave chips, and then receives a read data part. Therefore, when receiving the read command part, the master chip can determine, based on the chip ID, a slave chip that has performed data reading, and determine, based on address information, the address of the register from which data has been read. When receiving the read data part, the master chip can determine the data values of the register from which the data have been read, based on information on the data parts.

This enables the master chip to read data from the register of a slave chip from which data is desired to be read.

To reset a specific one of the slave chips, the master chip issues a reset transaction to the slave chip.

The reset transaction has only a command part, and the command part includes the C/D identifier which is activated, and the Chip ID which is set to a predetermined value for a slave to be reset (configuration value of the slave chip to be reset).

Before the reset transaction issued by the master chip returns to the master chip via the slave chips, and the master chip completes reception of the reset transaction, the master chip does not issue the next transaction.

After being issued from the master chip, the reset transaction is sent to the slave chips through the serial data signal line connecting the slave chips in a ring.

Each slave chip receives the transaction transferred from the master chip or the immediately preceding slave chip, and reads the identifiers and information on the chip ID configuration from the transaction. The slave chip starts reset processing in response to the transaction only when the received transaction is a reset transaction and at the same time the chip ID value is associated with the slave chip. When the received reset transaction is not associated with the slave chip, the slave chip does not execute reset processing, and passes the reset transaction to the next slave chip or the master chip.

Even when the received reset transaction is associated with the slave chip, the slave chip also passes the reset transaction to the next slave chip or the master chip.

When the received reset transaction is associated with the slave chip and the reset processing is to be executed, an internal circuit controlling transactions is reset. This internal circuit is provided in the slave chip, for carrying out control for transactions. At this time, a circuit of a block for delivering a transaction to the next slave chip or the master chip is controlled such that the reset is enabled after the transaction has been sent to the next slave chip or the master chip. This makes it possible to prevent the reset processing from affecting a transaction to be sent next.

Reset processing is realized by outputting a reset signal from the internal circuit controlling the reset transaction, such that the internal components of the slave chip are reset. When the reset processing by the reset transaction is executed, the internal circuit resets circuits within the slave chip while maintaining the reset signal in an activated state over a predetermined time period. Thereafter, the internal components of the internal circuit are reset, and when the predetermined time period has elapsed, the reset signal is deactivated.

In the following, a description will be given of details of the present embodiment.

The arrangement of the data processing system including the data transfer device according to the present embodiment is the same as that of the data processing system of the first embodiment shown in FIGS. 1 to 7. The data structure of serial data of transactions handled by the data transfer device according to the present embodiment is the same as that in the second embodiment shown in FIG. 8. Further, a reset operation by the data transfer device according to the present embodiment is the same as that by the second embodiment shown in FIG. 9. Therefore, the following description will be given with reference to these figures as required.

Referring to FIG. 6, when a reset command is sent from the CPU 2001 in the system controller 500 to the system bus bridge 2007 via the CPU bus 2126 and at the same time a chip to be reset is one of the printer image processing section 309, the image processing section 501, and the reader image processing section 308, the reset command is sent from the system bus bridge 2007 to the master interface 2147.

Upon receipt of the reset command, the master interface 2147 prepares a reset transaction based on the chip ID of a slave chip associated with the reset command. The reset transaction prepared by the master interface 2147 is delivered as serial data from the master interface 2147 to the printer image processing section 309 in timing synchronous with the synchronizing clock signal flowing on the synchronizing clock signal line 511.

The reset command is a command set issued to the master interface 2147, for resetting controllable slave chips individually or all at a time. The reset command includes a command for causing the master interface 2147 to issue the reset transaction, and a chip ID value of a slave chip desired to be reset.

The chip ID value is set to 1 when it is desired to reset the printer image processing section 309, to 2 when it is desired to reset the image processing section 501, and to 3 when it is desired to reset the reader image processing section 308. When it is desired to reset all the slave chips, the chip ID value is set to 0.

Referring to FIG. 7, the slave interface (1) 701 of the printer image processing section 309 receives a reset transaction, and if the chip ID value contained in the received reset transaction is 0 or equal to a chip ID value stored during the configuration transaction, reset processing is executed. In this case, before the reset processing is started, the reset transaction is sent as serial data from the master interface (1) 702 to the slave interface (2) 703 of the image processing section 501 in timing synchronous with the synchronizing clock signal flowing on the synchronizing clock signal line 511. The reset processing is executed after completion of transmission of the reset transaction from the master interface (1) 702.

The reset processing is performed on the internal circuit of the printer image processing section 309 as well as on the slave interface (1) 701 and the master interface (1) 702. The reset of the slave interface (1) 701 and the master interface (1) 702 is executed after completion of transmission of the reset transaction from the master interface (1) 702. The reset of the internal circuit of the printer image processing section 309 is performed by outputting a reset signal to the internal circuit from the slave interface (1) 701 or the master interface (1) 702.

The interface 901 in FIG. 9 corresponds to a pair of the slave interface (1) 701 and the master interface (1) 702. The aforementioned internal circuit corresponds to the internal circuit (1) 902, the internal circuit (2) 903, and the internal circuit (3) 904. During the reset operation, the interface 901 activates the reset signal 905 for the internal circuits 902 to 904. If the active time interval of the reset signal 905 is required to be not shorter than a predetermined time period, the active time interval is increased by an amount corresponding to the required time period, whereby the internal circuit (1) 902, the internal circuit (2) 903, and the internal circuit (3) 904 are reset. Simultaneously, the interface 901 itself enters a reset state.

The reset transaction is similarly passed through the image processing section 501 and the reader image processing section 308, and is finally sent to the slave interface 2148 of the system controller 500.

This enables the CPU 2001 to carry out a reset operation only on a desired slave chip, without adversely affecting the other slave chips by the reset operation.

The configuration of chip-to-chip serial data transfer, the format of serial data or unitary transactions, the configuring operation performed using chip-to-chip serial data transfer, a write operation performed using chip-to-chip serial data transfer, and a read operation performed using chip-to-chip serial data transfer are identical to those in the second embodiment, and therefore description thereof is omitted.

As described above in detail, according to the present embodiment, a master chip and a plurality of slave chips which receive data transferred from the master chip are connected in a ring, for transmission and reception of serial data between the chips. As a result, the single master chip can send the serial data to the slave chips in one transaction.

Further, each of the master chip and the slave chips is required to have only two ports, i.e. a port for serial data and a synchronizing clock signal port for serial data transfer, as interface ports. As a result, it is possible to reduce the number of ports in each chip.

Furthermore, even when the number of the slave chips is increased, the number of the ports in each of the chips is not changed, and the chips are connected in a ring by signal lines (the serial data signal line and the synchronizing clock signal line). As a result, it is possible to prevent an increase in the number of signal lines.

Moreover, when it is desired to reset or initialize a predetermined slave chip alone, it is possible to easily reset only the predetermined slave chip through communication with the slave chip from the master chip, without resetting the other chips and the system itself.

The present invention is not limited to the above described embodiments, but can be modified in various manners based on the subject matter of the present invention, which should not be excluded from within the scope of the present invention insofar as functions as recited in the appended claims or the functions performed by the construction of the above described embodiment can be achieved.

Cross Reference to Related Application

This application claims priority from Japanese Patent Application No. 2004-169150 filed Jun. 7, 2004, which is hereby incorporated by reference herein.

What is claimed is:

1. A method of transferring data between a single master chip and a plurality of slave chips, comprising:
    a connecting step of connecting the master chip and the slave chips that receive data transferred from the master chip, by a rind-shape path; and
    a data transfer step of transferring the data from the master chip to the slave chips via the rind-shape path,
    wherein the data transferred in said data transfer step comprises transactions, each of the transactions having information on at least one of writing, reading, configuration, and resetting to be executed on at least one of the slave chips,
    wherein the transactions include a command transaction containing information on a command, and a data transaction containing information on data for a register, the command transaction and the data transaction being separately transferred to each of the slave chips, and
    wherein the command transaction includes a first identifier for determining whether the transaction is for reading, writing, or configuration, a second identifier for determining whether the data is the command transaction or the data transaction, a third identifier for determining a data width of data of the data transaction, information on an address of the register for execution of the writing or the reading, and identifying information for discriminating between the slave chips.

2. A method as claimed in claim 1, wherein each of the slave chips is operable when receiving the command transaction, to read in the first identifier, the second identifier, the information on the address, and the identifying information, and perform processing on only a transaction to be processed, based on the first identifier, the second identifier, the address information, and the identifying information.

3. A method as claimed in claim 1, comprising an issuing step of causing the master chip to issue a transaction for configuration to the slave chips, and an adding step of assigning respective numbers to the slave chips, by the transaction for configuration, and adding the numbers to information in the command transaction as the identifying information.

4. A method as claimed in claim 3, wherein the master chip is capable of performing configuration on each of the slave chips any number of times by issuing the transaction for configuration.

5. A method of transferring data between a single master chip and a plurality of slave chips, comprising:
    a connecting step of connecting the master chip and the slave chips that receive data transferred from the master chip, by a rind-shape path; and
    a data transfer step of transferring the data from the master chip to the slave chips via the rind-shape path,
    wherein the data transferred in said data transfer step comprises transactions, each of the transactions having information on at least one of writing, reading, configuration, and resetting to be executed on at least one of the slave chips,
    wherein the transactions include a command transaction containing information on a command, and a data transaction containing information on data for a register, the command transaction and the data transaction being separately transferred to each of the slave chips, and
    wherein the data transaction contains a fourth identifier whether the data transaction is for reading, writing, or configuration, a fifth identifier for determining whether the data is the command transaction or the data transaction, a sixth identifier for determining a data width of data of the data transaction, and information on data in the resister for execution of the writing or the reading.

6. A method of transferring data and a synchronizing clock used for transfer of the data between a single master chip, and a first slave chip and a second slave chips, comprising:
    a connecting step of connecting the master chip, the first slave chip that receives the data transferred from the master chip according to the synchronizing clock, and the second slave chip that receive the data transferred from the first slave chip according to the synchronizing clock, by a ring-shape path; and
    a data transfer step of transferring the data from the master chip to the first and second slave chips via the ring-shape path,
    wherein the data transferred in said data transfer step comprises transactions, each of the transactions having information on at least one of writing, reading, configuration, and resetting to be executed on at least one of the first and second slave chips,
    wherein the transactions include a command part containing information on a command, and a data part containing information on data for a register, and the command part and the data part being separately transferred to the first and second slave chips, and
    wherein the command part includes a first identifier for determining whether the transaction is for reading, writing, configuration, or resetting, a second identifier for determining whether the data is the command part or the data part of the transaction, a third identifier for determining a data width of data of the data part, information on an address of the register for execution of the writing or the reading, and identifying information for discriminating between the first and second slave chips.

7. A method as claimed in claim 6, wherein the first and second slave chips are each operable when receiving the command part of the transaction, to read in the first identifier, the second identifier, the information on the address, and the identifying information, and perform processing on only a transaction to be processed, based on the first identifier, the second identifier, the address information, and the identifying information.

8. A method as claimed in claim 6, comprising an issuing step of causing the master chip to issue a transaction for configuration to the first and second slave chips, and an adding step of assigning respective numbers to the first and slave chips, by the transaction for configuration, and adding the numbers to information in the command part as the identifying information.

9. A method as claimed in claim 8, wherein the master chip is capable of performing configuration on each of the first and second slave chips any number of times by issuing the transaction for configuration.

10. A method as claimed in claim 6, comprising a selecting step of causing the master chip to select one of the first and second slave chips which is to be reset, using the identifier information added in the transaction for configuration, and a resetting step of causing the master chip to reset only the slave chip to be reset, by adding the identifier information together with an identifier for identifying the transaction for resetting, to the command part of the transaction.

11. A method of transferring data and a synchronizing clock used for transfer of the data between a single master chip, and a first slave chip and a second slave chips, comprising:

a connecting step of connecting the master chip, the first slave chip that receives the data transferred from the master chip according to the synchronizing clock, and the second slave chip that receive the data transferred from the first slave chip according to the synchronizing clock, by a ring-shape path; and a data transfer step of transferring the data from the master chip to the first and second slave chips via the rind-shape path, wherein the data transferred in said data transfer step comprises transactions, each of the transactions having information on at least one of writing, reading, configuration, and resetting to be executed on at least one of the first and second slave chips, wherein the transactions include a command part containing information on a command, and a data part containing information on data for a register, and the command part and the data part being separately transferred to the first and second slave chips, and wherein the data part includes a fourth identifier for determining whether the transaction is for reading, writing, configuration, or resetting, a fifth identifier for determining whether the data is the command part or the data part of the transaction, a sixth identifier for determining whether data width of data of the data part, and information on data for the register for execution of the writing or the reading.

12. A data transfer device comprising:

a single master chip;

a plurality of slave chips that receive data transferred from said master chip;

a connecting path that connects said master chip and said slave chips in a ring; and a data transfer unit that transfers the data from said master chip to said slave chips via said connecting path, wherein the data transferred by said data transfer unit comprises transactions, each of the transactions having information on at least one of writing, reading, configuration, and resetting to be executed on at least one of the slave chips, wherein the transactions include a command transaction containing information on a command, and a data transaction containing information on data for a register, the command transaction and the data transaction being separately transferred to each of the slave chips, and wherein the command transaction includes a first identifier for determining whether the transaction is for reading, writing, or configuration, a second identifier for determining whether the data is the command transaction or the data transaction, a third identifier for determining a data width of data of the data transaction, information on an address of the register for execution of the writing or the reading, and identifying information for discriminating between the slave chips.

13. A data transfer device comprising:

a single master chip;

a first slave chip that receives data transferred from said master chip according to a synchronizing clock transferred from said master chip;

a second slave chip that receives the data transferred from said first slave chip according to the synchronizing clock;

a connecting path that connects said master chip, said first slave chip, and said second slave chip in a ring; and a data transfer unit that transfers data from said master chip to said first and second slave chips said connecting path, wherein the data transferred by said data transfer unit comprises transactions, each of the transactions having information on at least one of writing, reading, configuration, and resetting to be executed on at least one of the first and second slave chips, wherein the transactions include a command part containing information on a command, and a data part containing information on data for a register, and the command part and the data part being separately transferred to the first and second slave chips, and wherein the command part includes a first identifier for determining whether the transaction is for reading, writing, configuration, or resetting, a second identifier for determining whether the data is the command part or the data part of the transaction, a third identifier for determining a data width of data of the data part, information on an address of the register for execution of the writing or the reading, and identifying information for discriminating between the first and second slave chips.

14. A data transfer device comprising:

a single master chip;

a plurality of slave chips that receive data transferred from said master chip;

a connecting path that connects said master chip and said slave chips in a ring; and a data transfer unit that transfers the data from said master chip to said slave chips via said connecting path, wherein the data transferred by said data transfer unit comprises transactions, each of the transactions having information on at least one of writing, reading, configuration, and resetting to be executed on at least one of the slave chips, wherein the transactions include a command transaction containing information on a command, and a data transaction containing information on data for a register, the command transaction and the data transaction being separately transferred to each of the slave chips, and wherein the data transaction contains a fourth identifier whether the data transaction is for reading, writing, or configuration, a fifth identifier for determining whether the data is the command transaction or the data transaction, a sixth identifier for determining a data width of data of the data transaction, and information on data in the resister for execution of the writing or the reading.

15. A data transfer device comprising:

a single master chip;

a first slave chip that receives data transferred from said master chip according to a synchronizing clock transferred from said master chip;

a second slave chip that receives the data transferred from said first slave chip according to the synchronizing clock;

a connecting path that connects said master chip, said first slave chip, and said second slave chip in a ring; and a data transfer unit that transfers data from said master chip to said first and second slave chips said connecting path, wherein the data transferred by said data transfer unit comprises transactions, each of the transactions having information on at least one of writing, reading, configuration, and resetting to be executed on at least one of the first and second slave chips, wherein the transactions include a command part containing information on a command, and a data part containing information on data for a register, and the command part and the data part being separately transferred to the first and second slave chips, and wherein the data part includes a fourth identifier for determining whether the transaction is for reading, writing, configuration, or resetting, a fifth identifier for determining whether the data is the command part or the data part of the transaction, a sixth identifier for determining whether data width of data of the data part, and information on data for the register for execution of the writing or the reading.

* * * * *